(12) United States Patent
Bauchot et al.

(10) Patent No.: US 9,629,112 B2
(45) Date of Patent: Apr. 18, 2017

(54) MASTERLESS SLOT ALLOCATION

(71) Applicant: International Business Machines Corporation, Armonk, NY (US)

(72) Inventors: Frederic Bauchot, Saint-Jeannet (FR); Jean-Yves Clement, Saint-Jeannet (FR); Gerard Marmigere, Drap (FR); Joaquin Picon, Cezanne (FR)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 14/602,664

(22) Filed: Jan. 22, 2015

(65) Prior Publication Data

US 2015/0131647 A1 May 14, 2015

Related U.S. Application Data

(63) Continuation of application No. 12/877,210, filed on Sep. 8, 2010, now Pat. No. 8,972,577.

(30) Foreign Application Priority Data

Sep. 2, 2010 (EP) .................................. 10305943

(51) Int. Cl.
*H04W 56/00* (2009.01)
*H04W 28/04* (2009.01)
(Continued)

(52) U.S. Cl.
CPC ..... *H04W 56/002* (2013.01); *H04W 56/0015* (2013.01); *H04W 28/042* (2013.01);
(Continued)

(58) Field of Classification Search
None
See application file for complete search history.

(56) References Cited

U.S. PATENT DOCUMENTS 5,987,023 A * 11/1999 Albrow ............... H04B 7/2681
370/350
6,028,853 A * 2/2000 Haartsen ............. H04B 7/2687
370/338
(Continued)

OTHER PUBLICATIONS

Office Action (Mail Date May 5, 2014) for U.S. Appl. No. 12/877,210, filed Sep. 8, 2010; Art Unit 2447; Confirmation No. 2759.
(Continued)

*Primary Examiner* — Hassan Kizou
*Assistant Examiner* — Hashim Bhatti
(74) *Attorney, Agent, or Firm* — Schmeiser, Olsen & Watts; John Pivnichny

(57) ABSTRACT

An approach is provided for collaboratively synchronizing devices in an ad hoc network. No device is acting as a master device or base station dictating time slot allocation to devices. A first device communicates with the other devices by a Media Access Control scheme based on time frames having time slots. Responsive to a determination that a current time slot allocated to a second device is occurring, a determination that a Boolean value selected according to a predetermined probability is true, and a transmission of a map of allocations of time slots to the devices, the first device determines the map indicates a conflict in which the same time slot is allocated to the first device and another device. The first device resolves the conflict by allocating another time slot to the first device, so that each time slot is allocated to no more than one corresponding device.

20 Claims, 11 Drawing Sheets

(51) Int. Cl.
  *H04W 48/16* (2009.01)
  *H04W 72/04* (2009.01)
  *H04W 84/18* (2009.01)
(52) U.S. Cl.
  CPC ........ *H04W 48/16* (2013.01); *H04W 72/0446* (2013.01); *H04W 84/18* (2013.01)

(56) References Cited

U.S. PATENT DOCUMENTS

| | | | | |
|---|---|---|---|---|
| 8,040,857 | B2* | 10/2011 | Wang | H04L 1/20 370/322 |
| 8,611,312 | B2* | 12/2013 | Sugaya | H04W 56/002 370/329 |
| 8,972,577 | B2* | 3/2015 | Bauchot | H04W 56/002 370/337 |
| 2004/0028018 | A1* | 2/2004 | Cain | H04B 7/2643 370/338 |
| 2005/0169221 | A1* | 8/2005 | Bennett | H04W 74/0841 370/338 |
| 2006/0067280 | A1* | 3/2006 | Howard | H04W 84/18 370/337 |
| 2006/0092909 | A1* | 5/2006 | Ho | H04W 48/08 370/348 |
| 2007/0280163 | A1* | 12/2007 | Zhang | H04W 84/18 370/331 |
| 2008/0316966 | A1* | 12/2008 | Joshi | H04W 74/02 370/330 |
| 2010/0124205 | A1* | 5/2010 | Ghanadan | H04W 72/1278 370/336 |
| 2012/0033620 | A1* | 2/2012 | Thoen | H04J 3/0697 370/329 |
| 2012/0059936 | A1* | 3/2012 | Bauchot | H04W 56/0015 709/226 |

OTHER PUBLICATIONS

Amendment filed Aug. 5, 2014 in response to Office Action (Mail Date May 5, 2014) for U.S. Appl. No. 12/877,210, filed Sep. 8, 2010; Art Unit 2447; Confirmation No. 2759.

Notice of Allowance (Mail Date Oct. 23, 2014) for U.S. Appl. No. 12/877,210, filed Sep. 8, 2010; Art Unit 2447; Confirmation No. 2759.

* cited by examiner 400-1

| Time | Slot | T1 | T2 | T3 | T4 | T5 | T6 | T7 | T8 | T9 | T10 | T11 | T12 |
|---|---|---|---|---|---|---|---|---|---|---|---|---|---|
| 1 | 1 | 4 | | 3 | | (11) | | 0 | | 10 | | (1) | |
| 2 | 2 | 4 | | 3 | | 11 | | 0 | | 10 | | 1 | |
| 3 | 3 | 4 | | (3) | | 11 | | 0 | | (10) | | 1 | |
| 4 | 4 | (4) | | 3 | | 11 | | (0) | | 10 | | 1 | |
| 5 | 5 | 4 | | 3 | | 11 | | 0 | | 10 | | 1 | |
| 6 | 6 | 4 | | 3 | | 11 | | 0 | | 10 | | 1 | |
| 7 | 7 | 4 | | 3 | | 11 | | 0 | | 10 | | 1 | |
| 8 | 8 | 4 | 13 | 3 | | 11 | | 0 | | 10 | | 1 | |
| 9 | 9 | 4 | 13 | 3 | | 11 | | 0 | | 10 | | 1 | |
| 10 | 10 | 4 | 13 | (3) | | 11 | | 0 | | (10) | | 1 | |
| 11 | 11 | 4 | 13 | 3 | | (11) | | 0 | | 10 | | (1) | |
| 12 | 12 | 4 | 13 | 3 | | 11 | | 0 | | 10 | | 1 | |
| 13 | 13 | (4) | (13) | (3) | | 11 | | 0 | | 10 | | 1 | |
| 14 | 14 | 4 | 13 | 3 | | 11 | | 0 | | 10 | | 1 | |
| 15 | 15 | 4 | 13 | 3 | | 11 | | 0 | | 10 | | 1 | |
| 16 | 0 | (4) | 13 | 3 | | 11 | | (0) | | 10 | | 1 | |
| 17 | 1 | 4 | 13 | 3 | | 11 | | 0 | | 10 | | 1 | |
| 18 | 2 | 4 | 13 | 3 | | 11 | | 0 | | 10 | | 1 | |
| 19 | 3 | 4 | (13) | (3) | | 11 | | 0 | | (10) | | 1 | |
| 20 | 4 | (4) | (13) | 3 | | 11 | | (0) | | 10 | | 1 | |
| 21 | 5 | 4 | 13 | 3 | | 11 | | 0 | | 10 | | 1 | |
| 22 | 6 | 4 | 13 | 3 | | 11 | | 0 | | 10 | | 1 | |
| 23 | 7 | 4 | 13 | 3 | | 11 | | 0 | | 10 | | 1 | |
| 24 | 8 | 4 | 13 | 3 | | 11 | | 0 | | 10 | | 1 | |
| 25 | 9 | 4 | 13 | 3 | | 11 | | 0 | | 10 | | 1 | |
| 26 | 10 | 4 | 13 | (3) | | 11 | | 0 | | (10) | | 1 | |
| 27 | 11 | 4 | 13 | 3 | | 11 | | 0 | | 10 | | 1 | |
| 28 | 12 | 4 | 13 | 3 | 13 | 11 | | 0 | | 10 | | 1 | |
| 29 | 13 | 4 | 13 | (3) | (13) | (11) | | 0 | | 10 | | 1 | |
| 30 | 14 | 4 | 13 | 3 | 13 | 11 | | 0 | | 10 | | 1 | |
| 31 | 15 | 4 | 13 | 3 | 13 | 11 | | 0 | | 10 | | 1 | |
| 32 | 0 | (4) | 13 | 3 | 13 | 11 | | (0) | | 10 | | 1 | |
| 33 | 1 | 4 | 13 | 3 | 13 | 11 | | 0 | | 10 | | 1 | |
| 34 | 2 | 4 | 13 | 3 | 13 | 11 | | 0 | | 10 | | 1 | |
| 35 | 3 | 4 | (13) | (3) | (13) | 11 | | 0 | | (10) | | 1 | |
| 36 | 4 | (4) | (12) | 3 | 7 | 11 | | (0) | | 10 | | 1 | |
| 37 | 5 | 4 | 12 | 3 | 7 | 11 | | 0 | | 10 | | 1 | |
| 38 | 6 | 4 | 12 | 3 | 7 | 11 | | 0 | | 10 | | 1 | |
| 39 | 7 | 4 | 12 | (3) | (7) | (11) | | 0 | | 10 | | 1 | |
| 40 | 8 | 4 | 12 | 3 | 7 | 11 | | 0 | | 10 | | 1 | |

| Time | Slot | T1 | T2 | T3 | T4 | T5 | T6 | T7 | T8 | T9 | T10 | T11 | T12 |
|---|---|---|---|---|---|---|---|---|---|---|---|---|---|
| 41 | 9 | 4 | 12 | 3 | 7 | 11 |  | 0 |  | 10 |  | 1 |  |
| 42 | 10 | 4 | 12 | 3 | 7 | 11 |  | 0 |  | (10) |  | 1 |  |
| 43 | 11 | 4 | 12 | 3 | (7) | (11) |  | 0 |  | 10 |  | (1) |  |
| 44 | 12 | (4) | (12) | (3) | 7 | 11 |  | 0 |  | 10 |  | 1 |  |
| 45 | 13 | 4 | 12 | 3 | 7 | 11 |  | 0 |  | 10 |  | 1 |  |
| 46 | 14 | 4 | 12 | 3 | 7 | 11 |  | 0 | 5 | 10 | 5 | 1 |  |
| 47 | 15 | 4 | 12 | 3 | 7 | 11 |  | 0 | 5 | 10 | 5 | 1 |  |
| 48 | 0 | (4) | 12 | 3 | 7 | 11 |  | (0) | (5) | 10 | 5 | 1 |  |
| 49 | 1 | 4 | 12 | 3 | 7 | (11) |  | 0 | 5 | 10 | (5) | (1) |  |
| 50 | 2 | 4 | 12 | 3 | 7 | 11 |  | 0 | 5 | 10 | 5 | 1 |  |
| 51 | 3 | 4 | (12) | (3) | (7) | 11 |  | 0 | 5 | (10) | 5 | 1 |  |
| 52 | 4 | (4) | (12) | 3 | 7 | 11 |  | (0) | 5 | 10 | 5 | 1 |  |
| 53 | 5 | 4 | (12) | 3 | (7) | 11 |  | (0) | (5) | (10) | (5) | (1) |  |
| 54 | 6 | 4 | 12 | 3 | 7 | 11 |  | 0 | 5 | 10 | 5 | 1 |  |
| 55 | 7 | 4 | 12 | (3) | (7) | (11) |  | 0 | 5 | 10 | (5) | 1 |  |
| 56 | 8 | 4 | 12 | 3 | 7 | 11 |  | 0 | 5 | 10 | 5 | 1 |  |
| 57 | 9 | 4 | 12 | 3 | 7 | 11 |  | 0 | 5 | 10 | 5 | 1 |  |
| 58 | 10 | 4 | 12 | (3) | 7 | 11 |  | 0 | (5) | (10) | (5) | 1 |  |
| 59 | 11 | 4 | 12 | 3 | (7) | (11) |  | 0 | 5 | 10 | 5 | (1) |  |
| 60 | 12 | (4) | (12) | (3) | 7 | 11 |  | 0 | (5) | 10 | 5 | 1 |  |
| 61 | 13 | 4 | 12 | 3 | 7 | 11 |  | 0 | 5 | 10 | 5 | 1 |  |
| 62 | 14 | 4 | 12 | 3 | 7 | 11 |  | 0 | 5 | 10 | 5 | 1 |  |
| 63 | 15 | 4 | 12 | 3 | 7 | 11 |  | 0 | 5 | 10 | 5 | 1 |  |
| 64 | 0 | (4) | 12 | 3 | 7 | 11 |  | (0) | (5) | 10 | 5 | 1 |  |
| 65 | 1 | 4 | 12 | 3 | 7 | (11) |  | 0 | 5 | 10 | (5) | (1) |  |
| 66 | 2 | 4 | 12 | 3 | 7 | 11 |  | 0 | 5 | 10 | 5 | 1 |  |
| 67 | 3 | 4 | 12 | (3) | (7) | 11 |  | 0 | 5 | (10) | 5 | 1 |  |
| 68 | 4 | (4) | 12 | 3 | 7 | 11 |  | (0) | 5 | 10 | 5 | 1 |  |
| 69 | 5 | 4 | 12 | 3 | (7) | 11 |  | (0) | (5) | (10) | (5) | (1) |  |
| 70 | 6 | 4 | 12 | 3 | 7 | 11 |  | 0 | 5 | 10 | 5 | 1 |  |
| 71 | 7 | 4 | 12 | (3) | (7) | 11 |  | 0 | 5 | 10 | (5) | 1 |  |
| 72 | 8 | 4 | 12 | 3 | 7 | 11 |  | 0 | 5 | 10 | 5 | 1 |  |
| 73 | 9 | 4 | 12 | 3 | 7 | 11 |  | 0 | 5 | 10 | 5 | 1 |  |
| 74 | 10 | 4 | 12 | (3) | 7 | 11 |  | 0 | (5) | (10) | (5) | 1 |  |
| 75 | 11 | 4 | 12 | 3 | (7) | (11) |  | 0 | 13 | 10 | 6 | (1) |  |
| 76 | 12 | (4) | (12) | (3) | 7 | 11 |  | 0 | (13) | 10 | 6 | 1 |  |
| 77 | 13 | 4 | (12) | 3 | 7 | 11 |  | (0) | (13) | (10) | 6 | 1 |  |
| 78 | 14 | 4 | 12 | 3 | 7 | 11 |  | 0 | 13 | 10 | 6 | 1 |  |
| 79 | 15 | 4 | 12 | 3 | 7 | 11 |  | 0 | 13 | 10 | 6 | 1 |  |
| 80 | 0 | (4) | 12 | 3 | 7 | 11 |  | (0) | (13) | 10 | 6 | 1 |  |

| Time | Slot | T1 | T2 | T3 | T4 | T5 | T6 | T7 | T8 | T9 | T10 | T11 | T12 |
|------|------|----|----|----|----|----|----|----|----|----|-----|-----|-----|
| 81 | 1 | 4 | 12 | 3 | 7 | 11 | | 0 | 13 | 10 | (6) | (1) | |
| 82 | 2 | 4 | 12 | 3 | 7 | 11 | | 0 | 13 | 10 | 6 | 1 | |
| 83 | 3 | 4 | (12) | (3) | 7 | 11 | | 0 | 13 | (10) | 6 | 1 | |
| 84 | 4 | (4) | (12) | 3 | 7 | 11 | | (0) | 13 | 10 | 6 | 1 | |
| 85 | 5 | 4 | 12 | 3 | 7 | 11 | | 0 | 13 | 10 | 6 | 1 | |
| 86 | 6 | 4 | 12 | 3 | (7) | 11 | | 0 | 13 | (10) | (6) | (1) | |
| 87 | 7 | 4 | 12 | (3) | (7) | (11) | | 0 | 13 | 10 | (6) | 1 | |
| 88 | 8 | 4 | 12 | 3 | 7 | 11 | | 0 | 13 | 10 | 6 | 1 | |
| 89 | 9 | 4 | 12 | 3 | 7 | 11 | | 0 | 13 | 10 | 6 | 1 | |
| 90 | 10 | 4 | 12 | 3 | 7 | 11 | | 0 | 13 | 10 | 6 | 1 | |

*FIG. 4C*

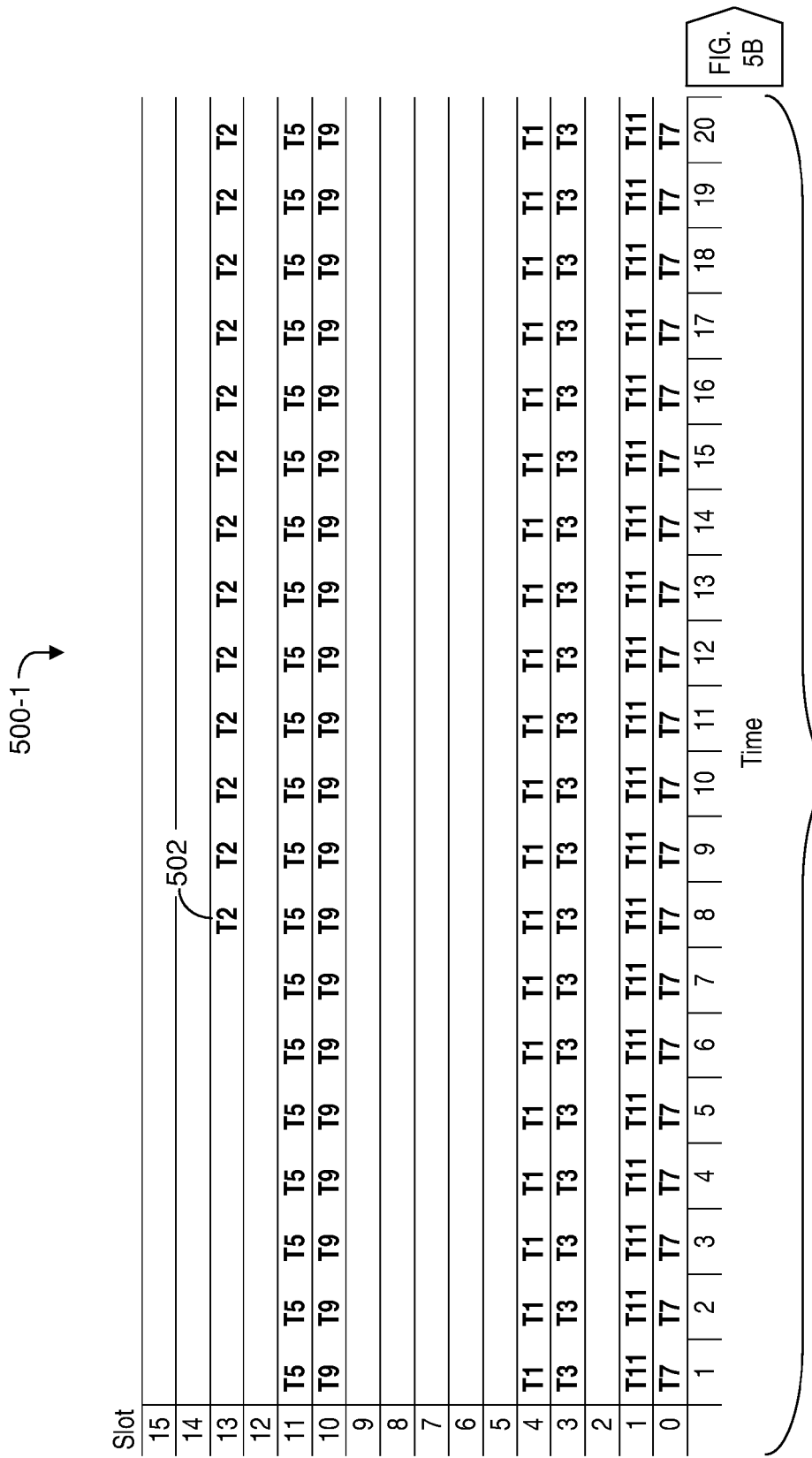

MASTERLESS SLOT ALLOCATION

This application is a continuation application claiming priority to Ser. No. 12/877,210 filed Sep. 8, 2010, now U.S. Pat. No. 8,972,577, issued Mar. 3, 2015.

FIELD OF THE INVENTION

The present invention relates to a data processing method and system for managing a computer network and more particularly to a technique for collaboratively synchronizing network entities communicating in an ad hoc network.

BACKGROUND

Known approaches to synchronizing wireless or wired networks utilize a master-slave relationship between network entities. A master device (e.g., a base station) in the master-slave relationship dictates a time slot-to-device relationship, thereby dictating when it is appropriate for each slave device to send and receive data. The master device scheme for synchronizing network entities is demanding in terms of memory, power consumption and/or computing power because a persistent infrastructure in the network is required or a device needs to take on the role of a base station "on the fly." Thus, there exists a need to overcome at least one of the preceding deficiencies and limitations of the related art.

BRIEF SUMMARY

Embodiments of the present invention provide a computer-implemented method of collaboratively synchronizing communicating devices in an ad hoc network at a time slot level. The method comprises:

a first device receiving a map from a second device, wherein the first device and the second device are included in the devices communicating in the ad hoc network in which no device of the devices acts as a master device or base station in the ad hoc network, the devices collaboratively synchronized at a time frame level based on time frames, each time frame having time slots, and wherein the map includes an allocation of the time slots to the devices;

subsequent to receiving the map, the first device determining the map indicates a conflict between the first device and another device of the devices, the conflict being indicated by a same time slot of the time slots being allocated to the first device and to the other device; and in response to determining the map indicates the conflict, the first device resolving the conflict by allocating another time slot of the time slots to the first device so that different time slots of the time slots are allocated to the first device and the other device, and each slot of the time slots is allocated to no more than a single corresponding device of the devices.

A system, program product and a process for supporting computing infrastructure corresponding to the above-summarized method are also described and claimed herein.

Embodiments of the present invention collaboratively synchronize, at a time slot level, devices communicating in a hierarchy-less ad hoc network using a time framed Media Access Control scheme. The collaborative synchronization at a time slot level presented herein allows the communicating devices to reach a state in which each time slot of the time frame is allocated to no more than one device without demanding excessive amounts of memory, power consumption and computing power.

BRIEF DESCRIPTION OF THE DRAWINGS

FIGS. 4A-4C depict a table of synchronization results that include time slots and the tags that occupy the slots over a period of time during which the collaborative synchronization process of FIG. 2 is simulated for the configuration of tags depicted in FIG. 3, in accordance with embodiments of the present invention.

FIGS. 5A-5D depict tags in the configuration of FIG. 3 and tags changing time slots to generate the results of FIGS. 4A-4C, in accordance with embodiments of the present invention.

DETAILED DESCRIPTION

Overview

Embodiments of the present invention provide collaborative synchronization of devices at a time slot level, where the devices communicate among themselves using a time frame based Media Access Control (MAC) scheme in an ad hoc network in which no infrastructure is present and in which no device nor other entity in the ad hoc network acts as a master device or base station that dictates an allocation of time slots in a time frame to the devices in the ad hoc network. Each device in the ad hoc network builds an internal map of the allocation of time slots to the devices. Within a map, each time slot is characterized by a busy field, an identifier field, and a live credit field, which are described in detail below. Each device is always present on its own map. Devices may have three states: Inactive, Dormant and Alive. When its time slot occurs, and with a probability p, a device transmits a message that includes the map included in the device. In response to the transmitted message, every live credit is decremented. If all live credit values become null, then the device is changed to the Dormant state. Outside its time slot, each device listens for transmitted messages from its neighboring devices. When a device receives a time slot from another device, the device updates its own map to resolve conflicts (i.e., to resolve a situation in which the same slot is allocated to two different devices) and to record more recent information.

As used herein, the collaborative synchronization of devices at a time slot level is defined as the devices communicating information therebetween in an ad hoc network to reach a state in which no time slot of a time frame is associated with more than one device and each device includes the same time slot allocation map. The devices are collaboratively synchronized by embodiments of the present invention subsequent to being collaboratively synchronized at a time frame level (i.e., devices reaching a state in which their internal clocks start a new time frame at substantially the same time). The collaborative synchronization of devices at a time frame level may utilize the synchronization process described in "System and Method for Synchronizing Communicating Entities in a Decentralized Network," U.S. Patent Application Publication No. 2010/0135331, filed Dec. 5, 2008, which is hereby incorporated herein by reference, in its entirety.

As used herein, a device is defined as an electronic or electromechanical machine or component that is a source of information transmitted in an ad hoc network and that receives information transmitted in an ad hoc network. Devices may include, but are not limited to, computers, radio frequency identification (RFID) tags, and smartphones.

Time Slot Level Synchronization System

Figure 1:
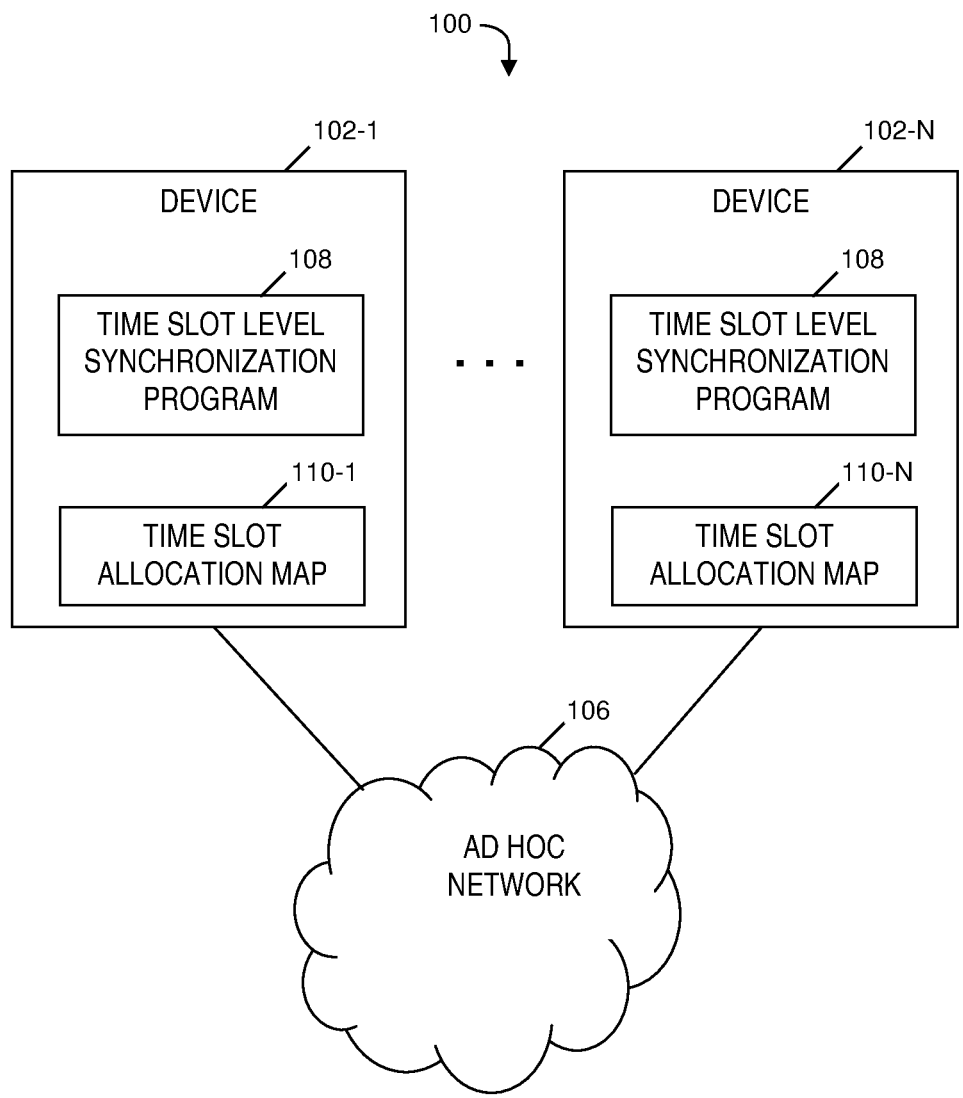
FIG. 1 is a block diagram of a system for collaboratively synchronizing communicating devices in an ad hoc network at a time slot level, in accordance with embodiments of the present invention.

FIG. 1 is a block diagram of a system for collaboratively synchronizing communicating devices in an ad hoc network at a time slot level, in accordance with embodiments of the present invention. System 100 includes N devices 102-1 . . . 102-N that communicate with each other via an ad hoc network 106. In one embodiment, the N devices are N RFID tags. The N devices 102-1 . . . 102-N are collaboratively synchronized at a time frame level. In one embodiment, N is an integer greater than 2. Each of the N devices includes time slot level synchronization program code 108. N devices 102-1 . . . 102-N also include time slot allocation maps 110-1 . . . 110-N in a one-to-one correspondence. Each of the time slot allocation maps 110-1 . . . 110-N is stored in a memory storage unit (not shown) included in the corresponding device. A time slot allocation map (e.g., time slot allocation map 110-1) may be a data structure that indicates the allocation of the time slots to the devices, and includes, for each time slot: an identifier field, a busy field and a life credit field (a.k.a. life field or live credit field), which are described below in Table 1.

The communication among the devices 102-1 . . . 102-N in network 106 may utilize a MAC scheme based on time frames. Each time frame in the MAC scheme has S time slots, where each time slot is allocated to one or more corresponding devices of the N devices 102-1 . . . 102-N. As used herein, a time slot being allocated to a device is also referred to as the device owning the time slot. In one embodiment, S is an integer greater than 2 and N is less than or equal to S. An i-th time slot allocation map of the N time slot allocation maps 110-1 . . . 110-N includes an i-th allocation of the S time slots to the N devices. Hereinafter, the i-th allocation of the S time slots to the N devices is also referred to simply as the i-th allocation. The i-th allocation is known to the i-th device of the N devices, where the i-th device corresponds to the i-th map. In other words, the i-th device sees the time frame according to the i-th allocation of the S time slots to the N devices. As used herein, i is an index of a device of the N devices, where i∈{1,N}.

For example, time slot allocation map 110-1 includes a first allocation (i.e., i=1) of the S time slots to the N devices 102-1 . . . 102-N. In this example, because time slot allocation map 110-1 is stored in device 102-1, device 102-1 has knowledge of the first allocation of the S time slots to the N devices.

The i-th allocation of time slots to devices is known to the i-th device because the i-th device stores the i-th allocation, but the i-th allocation is not known to any other device, unless the other device receives a message transmitted from the i-th device via network 106, where the message includes the i-th allocation. The message that includes an allocation of the time slots to the devices is transmitted by a device based on the occurrence of a particular time slot and the allocation of the time slot to the device, where the allocation is in the allocation map included in the device.

The maps 110-1 . . . 110-N may all include the same allocation of time slots to devices or at least two of the maps 110-1 . . . 110-N may include different allocations of time slots to devices.

No hierarchy exists in ad hoc network 106 and each device of the N devices 102-1 . . . 102-N has the same role in network 106. In one embodiment, the N devices 102-1 . . . 102-N operate in a peer-to-peer mode to communicate among themselves in ad hoc network 106. No device of the N devices 102-1 . . . 102-N (nor any other entity in network 106) has a role as a master device that dictates a particular allocation of the S time slots to the N devices. No device of the N devices (nor any other entity in network 106) dynamically obtains a temporary role of a base station that dictates a particular allocation of the S time slots to the N devices.

The discussion presented below relative to FIG. 2 includes additional description of the functionality of the components of system 100 and the details of the time slot based synchronization process that utilizes system 100 and that identifies and resolves conflicts in which the same time slot is allocated to two different devices and the two different devices are neighboring devices to each other and/or have at least one common neighbor device in network 106. As used herein, a neighbor of a first device in an ad hoc network is defined as a second device whose position in the ad hoc network allows the second device to successfully receive a message transmitted from the first device (e.g., the second device is within the geographic area reached by signals transmitted from the first device).

At some point during a time frame, two of the N devices 102-1 . . . 102-N (i.e., T1 and T2) are in conflict, as described above. During the process of collaborative synchronization of the N devices at a time slot level, devices T1 and T2 that are in conflict obtain knowledge of (i.e., identify) the conflict. After both devices T1 and T2 obtain knowledge of the conflict, the conflict is resolved by one or both of the two devices in conflict replacing its ownership of time slot s to an ownership of another time slot that is not allocated to any device. The two devices T1 and T2 may identify the conflict in one of two ways, which are described below.

First, devices T1 and T2 may identify the aforementioned conflict between them in a situation in which device T1 includes a first time slot allocation map that indicates that time slot s is allocated to device T1. Device T2 transmits a message that is received by device T1, where the message includes a second time slot allocation map that indicates that time slot s is allocated to the device that is transmitting the message (i.e., device T2). In response to receiving the transmitted message, device T1 obtains knowledge of the time slot s allocated to device T2 according to the second time slot allocation map. Since device T1 had prior knowledge of time slot s being allocated to device T1 based on the first allocation map, receiving the transmitted message from device T2 causes device T1 to have knowledge of the same time slot s being allocated to both devices T1 and T2, and thereby causes device T1 to have knowledge of the conflict between devices T1 and T2.

Secondly, devices T1 and T2 may identify the aforementioned conflict between them in a situation in which device T3 is different from either device T1 or device T2 and has knowledge of the conflict between devices T1 and T2. Device T3 has knowledge of the conflict because device T3 includes a time slot allocation map that indicates that the same time slot s is allocated to both devices T1 and T2. Device T3 transmits a message that is received by both devices T1 and T2 (i.e., device 3 is a common neighbor device to both devices T1 and T2), where the message includes the time slot allocation map that indicates that time slot s is allocated to both devices T1 and T2. In response to receiving the transmitted message, both devices T1 and T2 obtain knowledge of the same time slot s being allocated to devices T1 and T2 according to the time slot allocation map included in the received message, and thereby obtain knowledge of the conflict between themselves.

conflicts that arise between various devices communicating in network 106 are resolved until the time slot allocation maps 110-1 . . . 110-N converge to a single time slot allocation map that has no conflicts (i.e., every device 102-1 . . . 102-N has knowledge of the same allocation of time slots to devices and no two devices that are neighbors and/or have a common neighbor device are in conflict based on a time slot being allocated to both of the devices).

Table 1 presents variables used herein along with their meanings Table 1 uses "tag" and "tags" but it will be apparent to those skilled in the art that "tag" and "tags" may be replaced with "device" and "devices," respectively, to apply the meanings of the variables in Table 1 to the functionality of any of the N devices in FIG. 1. Furthermore, the names of the variables presented in Table 1 and used herein are examples only. The present invention contemplates embodiments in which other name(s) are used for one or more of the variables described in Table 1.

TABLE 1

| Variable | Meaning |
|---|---|
| S | Number of time slots in each time frame |
| s | Index of the current time slot; $s \in \{1, S\}$ |
| N | Number of tags |
| p | Probability of a tag transmitting a message to the other tags of the N tags, where the message includes a time slot allocation map. The variable p may take different values according to the tag state (see Table 2): If state of the tag = Inactive, then p = 0(i.e., no transmission) If state of the tag = Dormant, then $p = p_{Dormant} > 0$ (i.e., occasional transmission with the probability of the tag transmitting a message being $p_{Dormant} > 0$) If state of the tag = Alive, then $p = p_{alive} > p_{Dormant} > 0$ (i.e., transmission is more frequent than the occasional transmission for the Dormant tag state, with the probability of transmitting a message being $p_{alive} > p_{Dormant}$) |
| i | Index of a tag; $i \in \{1, N\}$ |
| $T_i$ | Tag having the index i |
| $ID_i$ | Identifier of tag $T_i$ |
| $x_i$ | Indicator of the time slot used by (i.e., owned by) tag $T_i$; $x_i \in \{1, S\}$ |
| $F_i = \{f_i^s\}_{s=1}^{s=S}$ | Frame as seen by tag $T_i$ (i.e., the time slot allocation map included in tag $T_i$) |
| $f_i^s = b_i^s \cup l_i^s \cup id_i^s$ | Represents how tag $T_i$ sees the busy field, life credit field and identifier field of a time slot |
| $b_i^s$ | Busy field that takes values to indicate whether a time slot having index s which is allocated to the i-th tag is free, busy or overbooked. For example, the busy field may take the value: 0 to indicate that the time slot is free (i.e., the time slot is idle and free to be allocated to a tag), 1 to indicate that the time slot is busy (i.e., exactly 1 tag owns the time slot), or 2 to indicate the time slot is overbooked (i.e., at least two tags own the time slot) |
| $l_i^s$ | Life credit field that includes a vector with entries that measure how fresh (i.e., how up-to-date or how recently updated) are the values in the busy field $b_i^s$ corresponding to $l_i^s$. A greater value in $l_i^s$ indicates a fresher (i.e., more up-to-date) value in $b_i^s$. In one embodiment, an entry in the life credit field may be a value in the range L to 0 inclusive, where L is specified below in this table. |
| L | A predetermined maximum value taken by an entry in the vector of the life credit field $l_i^s$ in response to the busy field value corresponding to the life credit field entry being updated. In one embodiment, L is an integer greater than 1. In another embodiment, L is a multiple of the length of the time frame. |
| $id_i^s$ | Identifier field that identifies an i-th tag of the N tags, where s is an index of a time slot allocated to the i-th tag. The time slot allocation map associates a time slot $x_i$ with $id_i^s$ to indicate that the time slot $x_i$ is allocated to the tag identified by $id_i^s$. The value in the $id_i^s$ field is equal to a hashed version of an $ID_i$ value. For example a Secure Hash Algorithm such as SHA-256 may be applied to the $ID_i$ value to obtain the value in the identifier field $id_i^s$. |

The resolution of the aforementioned conflict between two devices is included in the time slot based collaborative synchronization process, which is described below relative to FIG. 2. As the process of FIG. 2 is iteratively repeated, Table 2 presents states (a.k.a. tag modes) of tags along with the meanings of the tag modes. Table 2 uses "tag," but it will be apparent to those skilled in the art that "tag" may be replaced with "device" to apply the meanings of the modes in Table 2 to the state of any of the N devices in FIG. 1. Furthermore, the names of the tag modes included in Table 2 are examples. The present invention contemplates embodiments in which other name(s) are used for one or more of the tag modes presented in Table 2.

TABLE 2

| Tag mode | Meaning |
|---|---|
| Inactive | Mode reached by a tag in response to the tag determining that another tag shares the same identifier. In the Inactive mode, the tag has no activity at all. |
| Dormant | Mode reached by a tag in response to a delay since the tag's last reception of a message has exceeded a predefined delay threshold. In the Dormant mode, the tag may listen for transmissions from neighbor tags most of the time, and transmit information very rarely. |
| Alive | Mode reached by a tag in response to the tag hearing messages from neighbor (i.e., peer) tags, where the messages are not too old based on the life credit field. In the Alive mode, the tag may listen for transmissions from neighbor tags most of the time and transmit information rarely, but still transmit more frequently than if the tag were in the Dormant mode. |

Time Slot Level Synchronization Process

Figure 2:
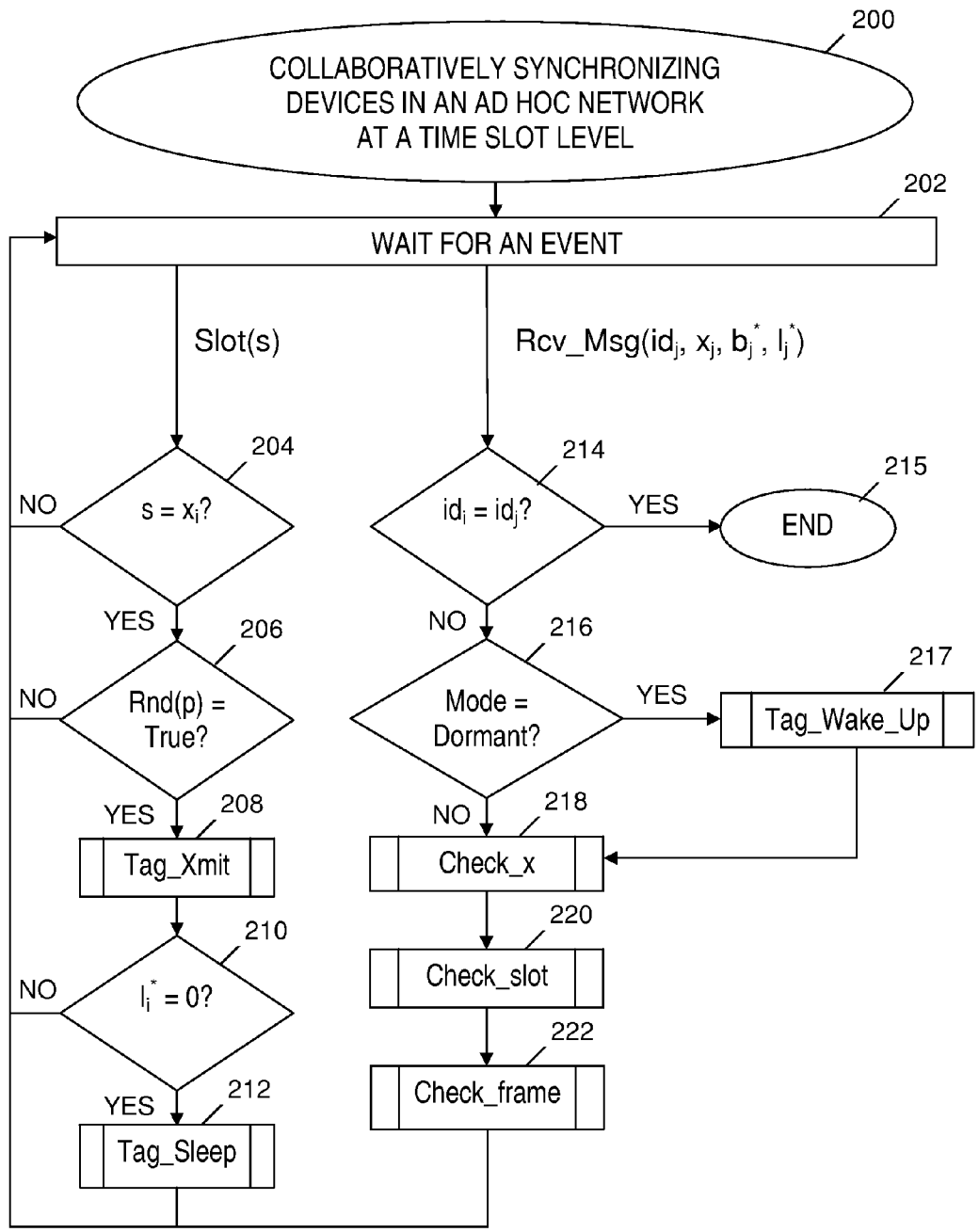
FIG. 2 is a flowchart of a process for collaboratively synchronizing communicating devices in an ad hoc network at a time slot level, where the process is implemented by the system of FIG. 1, in accordance with embodiments of the present invention.

FIG. 2 is a flowchart of a process for collaboratively synchronizing communicating devices in an ad hoc network at a time slot level, where the process is implemented by the system of FIG. 1, in accordance with embodiments of the present invention. The process of collaboratively synchronizing N communicating tags 102-1 . . . 102-N (see FIG. 1) in an ad hoc network 106 (see FIG. 1) at a time slot level begins at step 200. The process of FIG. 2 includes the N tags operating in a peer mode (i.e., each tag plays exactly the same role as all the other tags, without any type of hierarchy). Through the process of FIG. 2, the N tags collaboratively converge towards a state in which each time slot of the time frame is occupied by a single tag. It should be noted that the present invention contemplates the collaborative synchronization process at a time slot level as including embodiments in which "device" and "devices" replace "tag" and "tags," respectively, in the description of the process of FIG. 2.

The N tags are communicating with each other as described above relative to FIG. 1. The description of the process of FIG. 2 uses the variables in Table 1 and the tag modes in Table 2, which are presented above. Each tag $T_i$ of the N communicating tags in network 106 (see FIG. 1) records and stores the following information:

$ID_i$, $x_i$, and $F_i = \{f_i^s\}_{s=1}^{s=S}$

Starting with step 202 and for the subsequent steps in the process of FIG. 2, the current tag is tag $T_i$, whereas an alternate tag is represented by tag $T_j$. In step 202, a tag $T_i$ (i.e., a tag of the N tags 102-1 . . . 102-N in FIG. 1) waits for an event to occur in the ad hoc network 106 (see FIG. 1). The event referred to in step 202 is the occurrence of a new time slot of the S time slots in the time frame, and may also include tag $T_i$ receiving information in a message transmitted from tag $T_j$.

The tag $T_i$ wakes up each time a new time slot of the S time slots occurs. The occurrence of the new time slot is represented in FIG. 2 by the event "Slot(s)" where the "s" variable identifies the index of the current time slot within the time frame (see Table 1). In step 204, in response to receiving the event Slot(s), the time slot level synchronization program 108 (see FIG. 1) in tag $T_i$ determines whether the current time slot index s is equal to the index $x_i$ of the time slot owned by tag $T_i$.

If step 204 determines that s is not equal to $x_i$, then the No branch of step 204 is taken, program 108 (see FIG. 1) in tag $T_i$ does not allow tag $T_i$ to transmit a message to other tags (because the time slot that is occurring is not the time slot owned by tag $T_i$), and program 108 (see FIG. 1) in tag $T_i$ causes tag $T_i$ to wait in step 202 for a potential reception of information in a message transmitted by another tag of the N tags (i.e., alternate tag $T_j$).

If step 204 instead determines that s is equal to $x_i$, then the Yes branch of step 204 is taken and step 206 is performed by the program 108 (see FIG. 1) in tag $T_i$. In step 206, program 108 (see FIG. 1) in tag $T_i$ uses a known probability random number generator to select a random number that indicates a predefined Boolean value with a probability "p," where p is a predetermined probability value. Hereinafter, TRUE is used to indicate the predefined Boolean value referred to in step 206 and FALSE is the other possible Boolean value (i.e., step 206 selects a random number that indicates a FALSE Boolean value with a probability of (1-p)). If step 206 selects the TRUE value, then the Yes branch of step 206 is taken and step 208 is performed.

In step 208, program 108 (see FIG. 1) in tag $T_i$ transmits the following information to the other tags in network 106 (see FIG. 1):

$id_i^s$, $x_i$, and $\{b_i^s \cup l_i^s\}_{s=1}^{s=S}$

In one embodiment, step 208 transmits the aforementioned information by the Tag_Xmit sub-process as described below. Tag(s) that are neighbors of tag $T_i$ receive the information transmitted in step 208.

Following step 208, program 108 (see FIG. 1) in the tag $T_i$ determines in step 210 whether all entries in the vector in the life credit field in tag $T_i$ are equal to zero (i.e., the information transmitted by tag $T_i$ is not fresh). If step 210 determines that the life credit field indicators are equal to zero, then the Yes branch of step 210 is taken and step 212 is performed. In step 212, program 108 (see FIG. 1) in tag $T_i$ places tag $T_i$ in the Dormant mode. In one embodiment, program 108 (see FIG. 1) runs the Tag_Sleep sub-process in step 212, as described below. Following step 212, program 108 (see FIG. 1) in tag $T_i$ returns tag $T_i$ to the state in step 202 in which tag $T_i$ is waiting for an event.

Returning to step 210, if program 108 (see FIG. 1) in tag $T_i$ determines that the life credit field indicators are not all equal to zero, then the No branch of step 210 is taken and program 108 (see FIG. 1) returns tag $T_i$ to step 202 to wait for an event occurring in the next time slot, including a potential reception of information in a message transmitted by alternate tag $T_j$.

Returning to step 206, if program 108 (see FIG. 1) in tag $T_i$ selects the FALSE Boolean value, then the No branch of step 206 is taken and program 108 (see FIG. 1) returns tag $T_i$ to step 202 to wait for an event, including a potential reception of information in a message transmitted by alternate tag $T_j$.

When the tag $T_i$ does not transmit a message in step 208 and is returned to the wait state in step 202 (e.g., taking the No branch of step 204), the tag $T_i$ may receive information issued by an alternate tag $T_j$. The event in which tag $T_i$ receives information included in a message transmitted from tag $T_j$ and received by tag $T_i$ is represented by:

Rcv_Msg$\{id_j^s, x_j, \{b_j^s, l_j^s\}_{s=1}^{s=S}\}$ (a.k.a. Rcv_Msg($id_j$, $x_j$, $b_j^*$, $l_j^*$) as shown in FIG. 2).

That is, tag $T_i$ receives a message from tag $T_j$, where the message includes the information $id_j^s$, $x_j$, and $\{b_j^s, l_j^s\}_{s=1}^{s=S}$.

In response to receiving the event in which tag $T_i$ receives information included in a message transmitted from tag $T_j$, the program 108 (see FIG. 1) in tag $T_i$ determines in step 214 if the value in the identifier field of tag $T_i$ matches the value in the identifier field of the alternate tag $T_j$ (i.e., step 214 determines whether $id_i=id_j$).

If step 214 determines that $id_i=id_j$, then the Yes branch of step 214 is taken to indicate a "should not occur" condition, as each tag identifier is assumed to be unique. As a result of taking the Yes branch of step 214, program 108 (see FIG. 1) of tag $T_i$ places the tag $T_i$ in the Inactive mode (see Table 2), in which no further action nor process will be undertaken at all by tag $T_i$ in the future, and the process of FIG. 2 ends at step 215.

If step 214 determines that $id_i$ does not equal $id_j$, then the No branch of step 214 is taken and step 216 is performed. In step 216, program 108 (see FIG. 1) of tag $T_i$ determines if tag $T_i$ is in the Dormant mode (see Table 2).

If step 216 determines that tag $T_i$ is in the Dormant mode, then the Yes branch of step 216 is taken and step 217 is performed. In step 217, program 108 (see FIG. 1) in tag $T_i$ changes the Dormant mode of tag $T_i$ to an Alive mode (see Table 2). In one embodiment, step 217 is performed by running the sub-process Tag_Wake_Up, as described below. After step 217, program 108 (see FIG. 1) in tag $T_i$ starts handling the information in the received message in steps 218, 220 and 222. In one embodiment, steps 218, 220 and 222 are performed by running sub-processes Check_x, Check_slot, and Check_frame, respectively, as described below.

Returning to step 216, if tag $T_i$ is determined to be not in the Dormant mode, then the No branch of step 216 is taken and steps 218, 220 and 222 are performed in order to process the information in the received message. In one embodiment, steps 218, 220 and 222 following the No branch of step 216 are performed by running sub-processes Check_x, Check_slot, and Check_frame, respectively, as described below.

After step 222, program 108 in tag $T_i$ returns tag $T_i$ to step 202 to wait for an event.

Sub-Processes of the Time Slot Level Synchronization Process

In one or more embodiments, the sub-processes described in this section are included in the process of FIG. 2. The time slot level synchronization program 108 in tag $T_i$ detects the triggers and performs the actions listed below each sub-process.

Tag_Wake_Up Sub-Process (see step 217):
Trigger=reception of a valid signal (i.e., message) by a tag $T_i$ in Dormant mode, where the valid signal is issued by a tag $T_j$.
Action=
Select randomly $x_i \in \{1,S\}$. In an alternate embodiment, the selection of $x_i$ can be enhanced by avoiding a selection of a slot $x_i$ that is specified to be already occupied in the message issued by the tag $T_j$ (i.e., program 108 (see FIG. 1) in the tag $T_i$ checks $b_j^{x_i}$ and selects $x_i$ only if $b_j^{x_i}=0$). This check in the alternate embodiment is nevertheless not a mandatory step, as the overall scheme in the process of FIG. 2 gets rid of situations in which multiple tags have selected the same emitting time slot.
$\forall s \in \{1,S\}$, $b_i^s = l_i^s = id_i^s = 0$, which resets the data of tag $T_i$.
$b_i^{x_i}=1$, $l_i^{x_i}=L$, $id_i^{x_i}=\text{hash}(ID_i)$, which initializes the data of tag $T_i$ associated with the selected slot $x_i$.
Change the mode of tag $T_i$ to the Alive mode (see Table 2).

Tag_Xmit Sub-Process (see step 208):
Trigger=An occurrence of a new time slot, where the time slot index $s=x_i$ and the tag $T_i$ is in the Dormant or Alive mode (see Table 2), followed by the selection of a random Boolean value, with probability p, and the selection is found to be equal to TRUE.
Action=
$\forall s \in \{1,S\}$, $l_i^s$—(i.e., decrement the values in the life credit field if the value is positive). The vector in the life credit field is decremented each time a new transmission by tag $T_i$ occurs.
$\forall s \in \{1,S\}$, $b_i^s=0$ if $l_i^s=0$. Determine whether an entry $l_i^s$ in the vector of the life credit field is equal to 0. If the entry $l_i^s$ is equal to 0, then it means that the information in the tag $T_i$ that is associated with the time slot corresponding to the entry $l_i^s$ has not been refreshed for an excessive amount of time according to predefined criteria (e.g., the amount of time since the corresponding busy field entry has been updated exceeds a predefined threshold amount), and as a result, the value in the busy field of the time slot corresponding to the entry $l_i^s$ is changed so that the time slot is no longer considered to be occupied (a.k.a. allocated) (i.e., $b_i^s=0$ to indicate that the corresponding time slot is a free slot).
Tag $T_i$ transmits the information $\{id_i^s, x_i, \{b_i^s, l_i^s\}_{s=1}^{s=S}\}$ to the other tags in network 106 (see FIG. 1).

Tag_Sleep Sub-Process (see step 212):
Trigger=$\forall s \in \{1,S\}$, $l_i^s=0$. This trigger is reached when all the entries of the vector of the life credit field have been zeroed, meaning that the tag $T_i$ is no longer able to communicate with neighbor tags.
Action=
Clear $F_i = \{f_i^s\}_{s=1}^{s=S}$
Change the mode of tag $T_i$ to the Dormant mode, if tag $T_i$ is not yet in the Dormant mode.

Check_x Sub-Process (see step 218):
Trigger=reception of a message issued by a tag $T_j$. With the Check_x sub-process, the receiving tag $T_i$ handles a situation in which tag $T_i$ receives a message from a tag $T_j$ occupying the same slot as tag $T_i$. In response to recognizing the aforementioned situation, the tag $T_i$ moves to another free slot.
Action=if $x_j=x_i$ (i.e., the condition that indicates that tag $T_j$ occupies the same slot as tag $T_i$), then:
$F=\text{Card}(\{f\}_{w=1}^{w=S} | b_i^w=0)$ (i.e., determine the number of time slots that are currently free slots)
if $F>0$ (i.e., at least one free time slot currently exists) then
$b_i^{x_i}=b_j^{x_i}$, $l_i^{x_i}=l_j^{x_i}$ (i.e., the tag $T_i$ leaves its current time slot occupied by the tag $T_j$).
Select randomly a new $x_i \in (\{f\}_{w=1}^{w=S} | b_i^w=0)$ to be allocated to tag $T_i$
$b_i^{x_i}=1$, $l_i^{x_i}=L$ (i.e., because the tag $T_i$ occupies the new time slot randomly selected in the previous step, set the values to indicate that the new time slot is busy and is associated with fresh information).
Otherwise (i.e., if $F=0$), it means that the time frame size has been poorly dimensioned, as all the time slots are occupied. This situation is a "should not occur" situation that the tag $T_i$ may ignore. Thus, if $F=0$, tag $T_i$ does nothing (as if tag $T_i$ had not received a message from the alternate tag $T_j$).

Check_slot Sub-Process (see step 220):
Trigger=reception of a message issued by a tag $T_j$. With the Check_slot sub-process, the tag $T_i$ updates the information of its own current time slot according to the received message.

Action=
- $l_i^{x_i}=L$: Because the tag $T_i$ received a message, the tag $T_i$ understands that tag $T_i$ is still part of a set of tags in network 106 (see FIG. 1). Therefore, tag $T_i$ sees itself as a "fresh" (i.e., up-to-date) member of the set of tags and sets its entry in the vector of the life credit field to the value (i.e., L) that indicates that the corresponding information of tag $T_i$ has maximum freshness.
- If $b_i^s=0$, then $b_i^s=1$, $id_i^s=hash(ID_j)$, $l_i^s=L$: If the current time slot was previously considered to be idle (i.e., free because $b_i^s=0$), then the value in the busy field corresponding to the current time slot is changed so that the current time slot is now considered to be busy and occupied by the tag $T_j$.
- If $b_i^s=1$ and $id_i^s \ne hash(ID_j)$, then $b_i^s=2$, $id_i^s=0$, $l_i^s=L$: If the current time slot was previously seen as occupied by a tag (i.e., $T_k$) other than $T_j$, then the value in the busy field corresponding to the current time slot is changed so that the current time slot is now considered to be overbooked by being occupied by the two different tags (i.e., two different tags $T_j$ and $T_k$ are in conflict due to the same time slot being allocated to both of the tags). In response to this action being performed, tag $T_i$ identifies (i.e., obtains knowledge of) the conflict between $T_j$ and $T_k$. This information about the time slot being overbooked is later transmitted in one or more other messages to the two different tags $T_j$ and $T_k$ (i.e., the tags that occupy the current time slot) so that the conflict between tags $T_j$ and $T_k$ may be resolved.
- If $b_i^s=1$ and $id_i^s=hash(ID_j)$, then $l_i^s=L$: If the current time slot was previously seen as occupied by the tag $T_j$, then only the value in the life credit field corresponding to the current time slot is updated to L (i.e., to indicate that the information in tag $T_j$ corresponding to the current time slot is fresh).

Check_frame Sub-Process (see step 222):
Trigger=reception of a message issued by a tag $T_j$. With the Check_frame sub-process, the tag $T_i$ updates its other time slot information (i.e., information corresponding to time slots other than the current time slot) according to the received message.
Action 1=if $b_j^{x_j}=2$ (i.e., this condition addresses the scenario in which the tag $T_j$ transmitting the message has knowledge of a conflict between tags $T_i$ and $T_k$ based on tags $T_i$ and $T_k$ occupying the same time slot, but the tag $T_j$ is different from tag $T_i$ and tag $T_k$ and does not occupy the same slot as tags $T_i$ and $T_k$), then:
F=Card($\{f\}_{w=1}^{w=S} | b_i^w=0$) (i.e., determine the number of time slots that are currently free slots)
if F>0 (i.e., at least one free time slot currently exists) then
- $b_i^{x_i}=b_k^{x_i}$, $l_i^{x_i}=l_k^{x_i}$ (i.e., the tag $T_i$ leaves its current time slot, which is occupied by the tag $T_k$).
- Select randomly a new $x_i \in (\{f\}_{w=1}^{w=S} | b_i^w=0)$ to be allocated to tag $T_i$.
- $b_i^{x_i}=1$, $l_i^{x_i}=L$ (i.e., because the tag $T_i$ occupies the new time slot randomly selected in the previous step, set the values to indicate that the new time slot is busy and is associated with fresh information).
- Otherwise (i.e., if F=0), it means that the time frame size has been poorly dimensioned, as all the time slots are occupied. This situation is a "should not occur" situation that the tag $T_i$ may ignore. Thus, if F=0, tag $T_i$ does nothing (as if tag $T_i$ had not received a message from the alternate tag $T_j$).

Action 2=for all k≠s
If $b_j^k > b_i^k$ then $b_i^k = b_j^k$, $l_i^k = l_j^k$: The value in the busy field for any idle time slot is updated to indicate that the time slot is a busy slot, and the value in the busy field for any busy slot is updated to indicate that the time slot is overbooked (i.e., two tags are in conflict by occupying the same time slot).
If $b_j^k = b_i^k$ then $l_i^k = \max(l_i^k, l_j^k)$: When the value of the busy field in the received message is found to be equal to the value of the busy field recorded in tag $T_i$, then the value of the corresponding life credit field is selected as the life credit field value in the received message or the life credit field value recorded in tag $T_i$, whichever is the value that indicates the fresher information.

EXAMPLE

Figure 3:
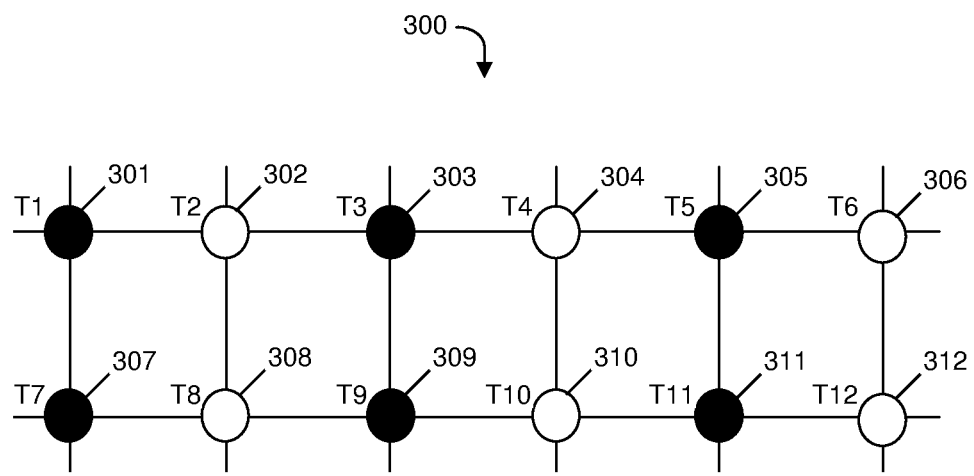
FIG. 3 depicts a sample configuration of tags that are to be collaboratively synchronized by the process of FIG. 2 in a simulation, in accordance with embodiments of the present invention.

FIG. 3 depicts a sample configuration of tags that are to be collaboratively synchronized by the process of FIG. 2 in a simulation, in accordance with embodiments of the present invention. Configuration 300 of twelve tags 301, 302, 303, 304, 305, 306, 307, 308, 309, 310, 311 and 312 (i.e., tags T1 through T12) is an example of a set of tags that may be included in ad hoc network 106 (see FIG. 1). The twelve tags T1 through T12 are organized in two rows, and each tag has a reception range such that each tag can hear its immediate neighbors only. That is, a tag in configuration 300 can successfully receive a transmitted message only from other tags that are connected to the tag by line segments depicted in FIG. 3. For example, T9 can hear transmitted messages from only T3, T8 and T10, which is indicated by line segments in FIG. 3 that connect T3 to T9, T8 to T9, and T10 to T9.

The time frame on which the communication among the tags in configuration 300 takes place includes 16 time slots (i.e., slots 0 through 15). An initial configuration of tags is depicted by the 6 tags represented by solid black circles in FIG. 3 (i.e., tags T1, T3, T5, T7, T9 and T11). The tags represented by the open circles in FIG. 3 (i.e., tags T2, T4, T6, T8, T10 and T12) are later added to the initial configuration to form configuration 300. As described below relative to FIGS. 4A-4C, four of the added tags cause conflicts based on single time slots being allocated to the different tags.

FIGS. 4A, 4B and 4C depict a table of synchronization results that include time slots and the tags that occupy the slots over a period of time during which the collaborative synchronization process of FIG. 2 is simulated for the configuration of tags depicted in FIG. 3, in accordance with embodiments of the present invention.

Tables 400-1, 400-2 and 400-3 in FIGS. 4A, 4B and 4C, respectively, include columns that indicate a time period (i.e., the Time column), a current time slot (i.e., the Slot column) during which the tag(s) that own the current time slot are permitted to transmit a message, and slot indices associated with the tags T1 through T12 in FIG. 3 (see columns T1 through T12). For example, at Time 17 in table 400-1 (i.e., at the row in which the Time column includes the value of 17), time slot 1 is the current time slot (i.e., the Slot column has a value of 1 in the aforementioned row), T1 owns time slot 4, T2 owns time slot 13, T3 owns time slot 3, T5 owns time slot 11, T7 owns time slot 0, T9 owns time slot 10, and T11 owns time slot 1.

Tables 400-1, 400-2 and 400-3 in FIGS. 4A, 4B and 4C, respectively, use the following indicators:

A number encircled with a solid line indicates the current slot and the corresponding tag has transmitted a message. For example, the 1 encircled with a solid line in the Time=1 row in table 400-1 (see FIG. 4A) indicates that slot 1 is the current slot and T11 (i.e., the column that includes the 1 encircled by the solid circle) transmitted a message at Time=1. Note that in some rows, there is no number encircled by a solid circle because the current time slot is not allocated to any of the tags in the current configuration (e.g., the Time=2 row in table 400-1 in FIG. 4A) or because the Boolean value randomly selected in step 206 (see FIG. 2) was FALSE (see, e.g., the Time=17 row in table 400-1 in FIG. 4A, where there is no transmitted message even though the current slot is owned by T11, which is in the current configuration of tags).

A number encircled by a dashed line indicates a neighbor that receives the transmitted message at the time indicated by the corresponding row. For example, the 11 encircled by the dashed line in the Time=1 row in table 400-1 in FIG. 4A indicates that T5 (i.e., the tag associated with the column corresponding to the encircled 11) receives the message transmitted by T11.

A number encircled by a dotted circle indicates a tag that does not receive any information from a transmission because two transmissions from two tags in conflict cause a data collision. For example, the 10 encircled by a dotted line in the Time=69 row in table 400-2 in FIG. 4B indicates that T9 does not receive any information from the messages being transmitted by T8 and T10 because of data collision.

A pair of vertical bars with diagonal lines indicates that the corresponding tag has detected a conflict between two tags. For example, the vertical bars with diagonal lines in the Time=29 row in table 400-1 in FIG. 4A indicates that T3 detected the conflict between T2 and T4.

The open circle in the upper left quadrant of a cell indicates that the corresponding tag identifies slot 5 as being occupied by T8 from (1) knowledge of the corresponding tag's own slot where the corresponding tag is T8, (2) knowledge obtained from receiving a previous message that indicated slot 5 is occupied by T8, or (3) knowledge obtained from receiving a message in the current time slot that indicates that slot 5 is occupied by T8. For example, the open circles in the upper left quadrants of three cells in the Time=53 row in table 400-2 in FIG. 4B indicate that T8 identifies slot 5 as being occupied by T8 (i.e., from T8's knowledge of its own slot), and T2 and T7 identify slot 5 as being occupied by T8 (i.e., from being neighbors of T8 and receiving T8's message transmitted at Time=53).

The solid black circle in the upper right quadrant of a cell indicates that the corresponding tag identifies slot 5 as being occupied by T10 from (1) knowledge of the corresponding tag's own slot and the corresponding tag is T10, (2) knowledge obtained from receiving a previous message that indicated slot 5 is occupied by T10, or (3) knowledge obtained from receiving a message in the current time slot that indicates that slot 5 is occupied by T10. For example, the solid black circles in the upper right quadrants of three cells in the Time=53 row in table 400-2 in FIG. 4B indicate that T10 identifies slot 5 as being occupied by T10 (i.e., from T10's knowledge of its own slot), and T4 and T11 identify slot 5 as being occupied by T10 (i.e., from being neighbors of T10 and receiving T10's message transmitted at Time=53).

At Time=8 (see table 400-1 in FIG. 4A), T2 joins the set of tags in configuration 300 (see FIG. 3) and there is no conflict. At Time=28 (see table 400-1 in FIG. 4A), T4 joins the set of tags in configuration 300 (see FIG. 3) and a conflict occurs because slot 13 is allocated to both T2 and T4. At Time=35 (see table 400-1 in FIG. 4A), both T2 and T4 detect the conflict that exists between themselves because T3 (i.e., a common neighbor to both T2 and T4 in configuration 300 in FIG. 3) transmits a message that indicates the conflict and both T2 and T4 receive the transmitted message. T3 first had knowledge of the conflict at Time=29 (see table 400-1 in FIG. 4A) because T3 received a message from its neighbor T4 at Time=29 that indicated that T4 owns slot 13 and T3 had previously received a message from its neighbor T2 at Time=13 (see table 400-1 in FIG. 4A) that indicated that T2 owns slot 13.

After T2 and T4 both detect the conflict between themselves, the conflict is resolved at Time=36 (see table 400-1 in FIG. 4A) by T2 occupying slot 12 instead of slot 13 and by T4 occupying slot 7 instead of slot 13.

At Time=46 (see table 400-2 in FIG. 4B), both T8 and T10 join the set of tags in configuration 300 (see FIG. 3) and a conflict between T8 and T10 exists because slot 5 is allocated to both T8 and T10. At Time=74 (see table 400-2 in FIG. 4B), both T8 and T10 detect the conflict between themselves because their common neighbor T9 transmits a message that indicates the conflict and both T8 and T10 receive the message from T9. T9 first had knowledge of the conflict at Time=67 (see table 400-2 in FIG. 4B) because T9 received a message from T3, which already had knowledge of the conflict since Time=60 (see table 400-2 in FIG. 4B). T3 detected the conflict by receiving the information that slot 5 is occupied by T8 from T2, as indicated by the open circles in the upper left quadrants in the Time=60 row, and by having previously received knowledge that slot 5 is occupied by T10 in a message from T4 at Time=55 (see table 400-2 in FIG. 4B), as indicated by the solid black circles in the upper right quadrants in the Time=55 row.

After T8 and T10 both detect the conflict between themselves at Time=74, the conflict is resolved at Time=75 (see table 400-2 in FIG. 4B) by T8 occupying slot 13 instead of slot 5 and by T10 occupying slot 6 instead of slot 5.

As messages that include the resolved conflict between T8 and T10 are transmitted, other tags obtain the knowledge of the conflict resolution. At Time=87 (see table 400-3 in FIG. 4C), the resolution of the conflict between T8 and T10 is propagated to all tags in the current configuration, as indicated by the absence of any vertical bars with diagonal lines.

FIGS. 5A-5D depict tags in the configuration of FIG. 3 and tags changing time slots to generate the results of FIGS. 4A-4C, in accordance with embodiments of the present invention. Table 500-1 in FIG. 5A indicates at step 502 that T2 joins the configuration of tags and occupies slot 13 at Time=8.

Figure 5B:
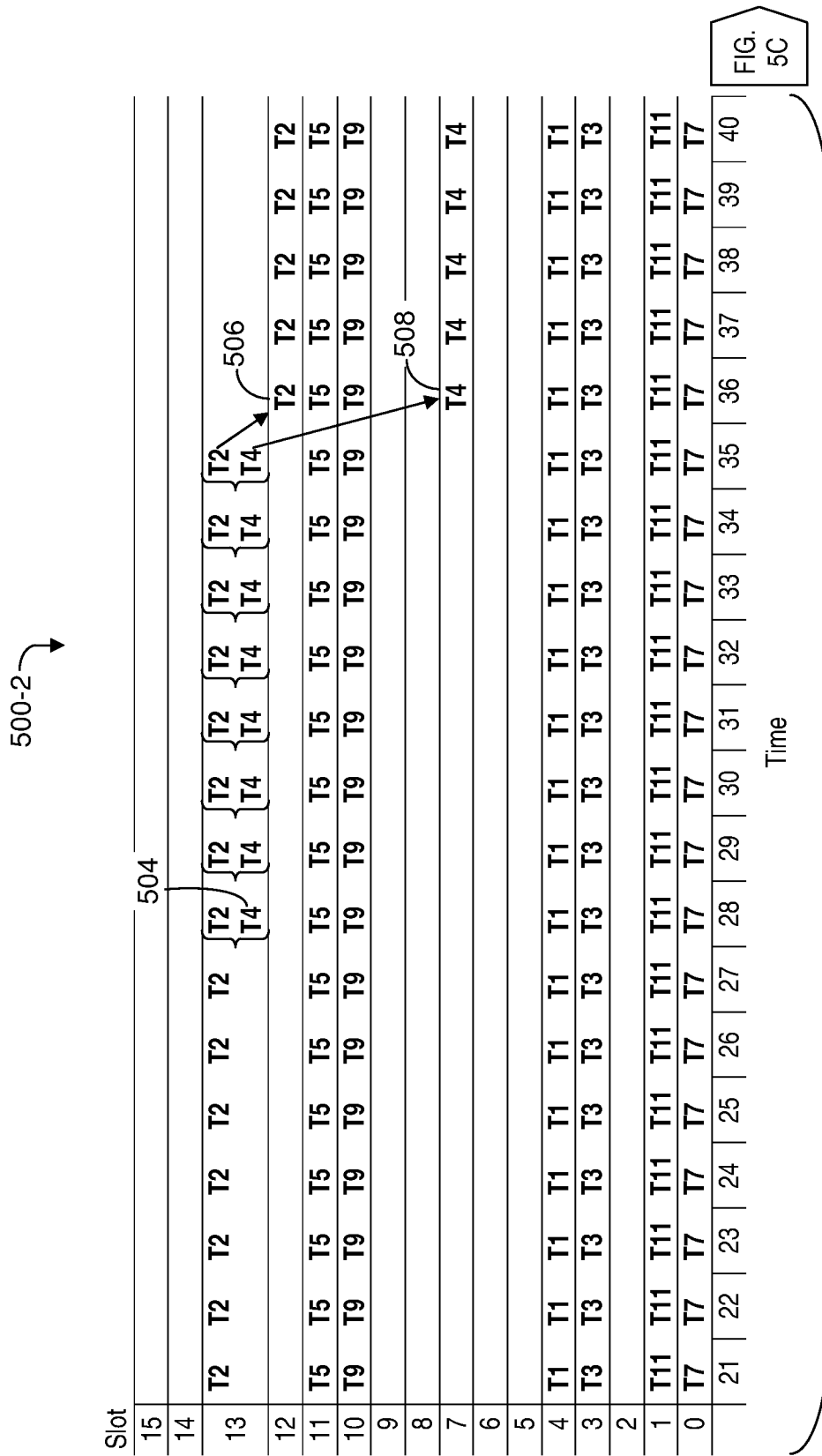

Table 500-2 in FIG. 5B indicates at step 504 (i.e., Time=28) that T4 joins the configuration of tags and a conflict occurs between T2 and T4, as both T2 and T4 occupy the same slot (i.e., slot 13). At steps 506 and 508 in table 500-2 (i.e., at Time=36), the conflict between T2 and T4 is resolved as T2 occupies slot 12 (see step 506) and T4 occupies slot 7 (see step 508).

Figure 5C:
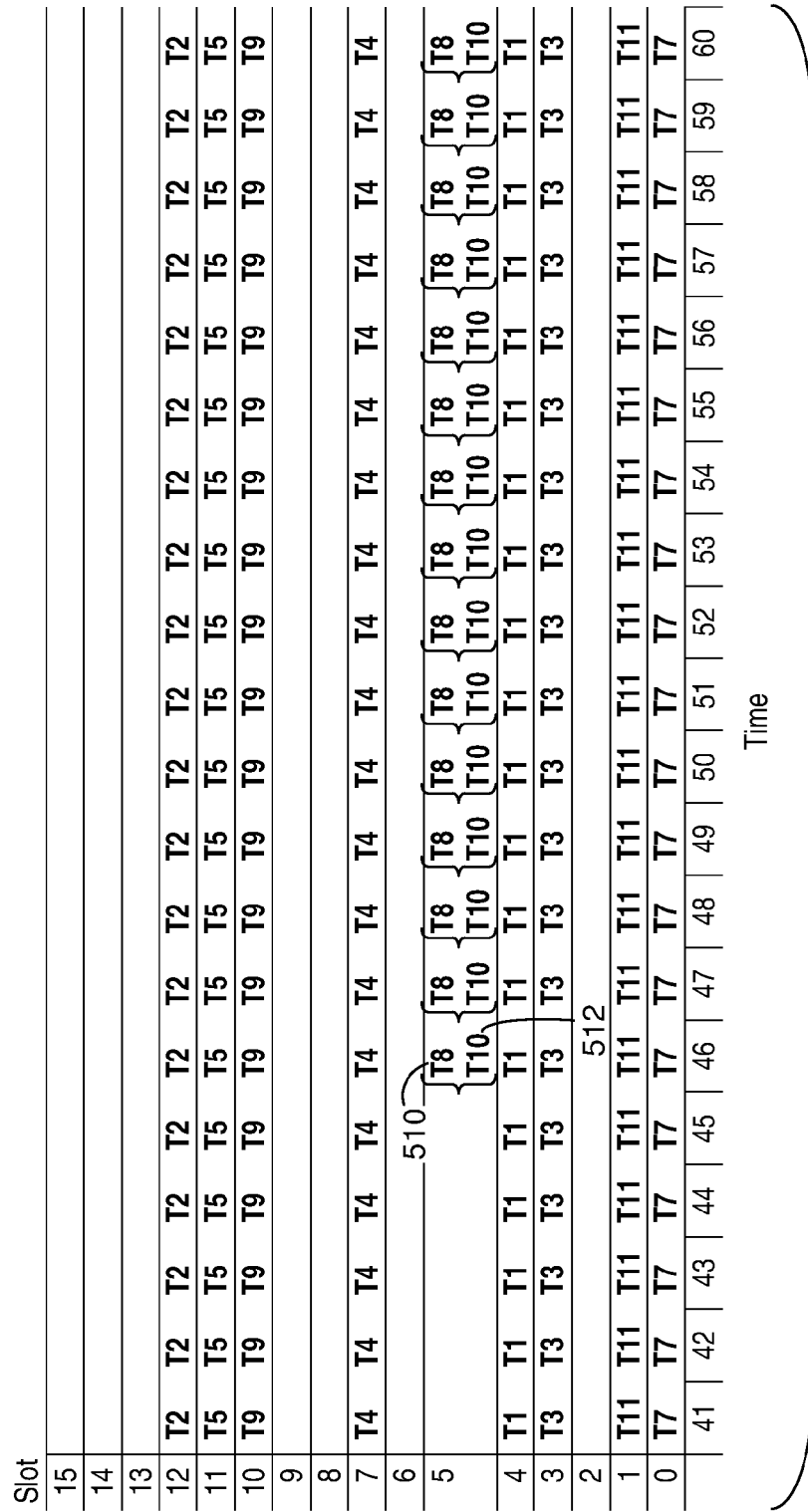
Figure 5D:
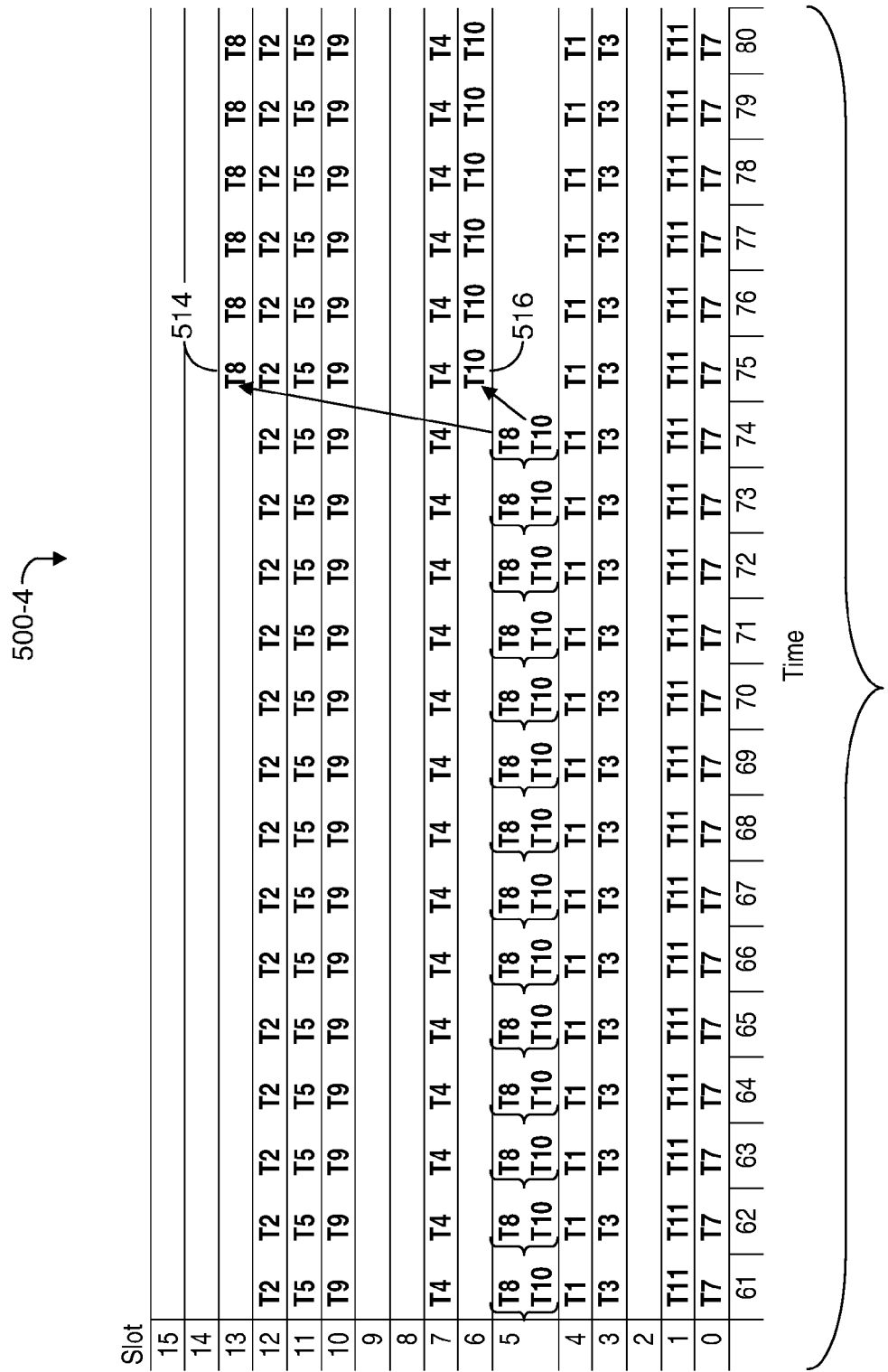

As shown in table 500-3 in FIG. 5C at Time=46, T8 joins the configuration of tags (see step 510) and T10 joins the configuration of tags (see step 512). Table 500-4 in FIG. 5D shows the resolution of the conflict between T8 and T10 at Time=75 as T8 occupies slot 13 (see step 514) and T10 occupies slot 6 (see step 516).

Computer System

Figure 6:
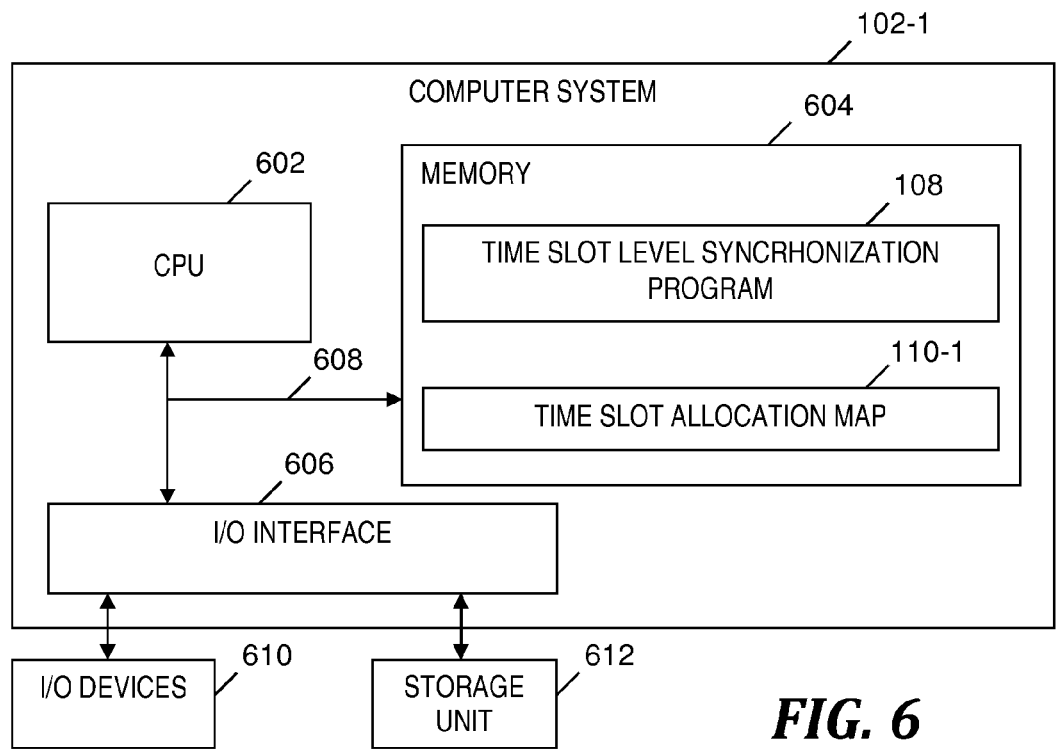
FIG. 6 is a block diagram of a computer device that is included in the system of FIG. 1 and that implements the process of FIG. 2, in accordance with embodiments of the present invention.

FIG. 6 is a block diagram of a computer device (i.e., computer system 102-1) that may be included in the system of FIG. 1 and that implements the process of FIG. 2, in accordance with embodiments of the present invention. Computer system 102-1 generally comprises a central processing unit (CPU) 602, a memory 604, an input/output (I/O) interface 606, and a bus 608. Further, computer system 102-1 is coupled to I/O devices 610 and a computer data storage unit 612. CPU 602 performs computation and control functions of computer system 102-1. CPU 602 may comprise a single processing unit, or be distributed across one or more processing units in one or more locations (e.g., on a client and server).

Memory 604 may comprise any known computer readable storage medium, which is described below. In one embodiment, cache memory elements of memory 604 provide temporary storage of at least some program code (e.g., program code 108) in order to reduce the number of times code must be retrieved from bulk storage while instructions of the program code are carried out. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computer system 102-1, and may comprise any type of transmission link, including electrical, optical, wireless, etc.

I/O interface 606 also allows computer system 102-1 to store and retrieve information (e.g., data or program instructions such as program code 108) from an auxiliary storage device such as computer data storage unit 612 or another computer data storage unit (not shown). Computer data storage unit 612 may comprise any known computer readable storage medium, which is described below. For example, computer data storage unit 612 may be a non-volatile data storage device, such as a magnetic disk drive (i.e., hard disk drive) or an optical disc drive (e.g., a CD-ROM drive which receives a CD-ROM disk).

Memory 604 may store computer program code 108 that provides the logic for collaboratively synchronizing devices at a time slot level where the devices are communicating in an ad hoc network, which is included in the process in FIG. 2. Memory 604 may store time slot allocation map 110-1. Further, memory 604 may include other systems not shown in FIG. 6, such as an operating system (e.g., Linux) that runs on CPU 602 and provides control of various components within and/or connected to computer system 102-1.

Storage unit 612 and/or one or more other computer data storage units (not shown) that are coupled to computer system 102-1 may store the time slot allocation map 110-1 instead of, or in addition to, memory 604.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer readable medium(s) (e.g., memory 604 or computer data storage unit 612) having computer readable program code (e.g., program code 108) embodied or stored thereon.

Any combination of one or more computer readable medium(s) (e.g., memory 604 and computer data storage unit 612) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program (e.g., program 108) for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 108) embodied on a computer readable medium may be transmitted using any appropriate medium, including but not limited to wireless, wireline, optical fiber cable, RF, etc., or any suitable combination of the foregoing.

Computer program code (e.g., program code 108) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102-1 or another computer system (not shown) having components analogous to the components of computer system 102-1 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2) and/or block diagrams of methods, apparatus (systems) (e.g., FIG. 1, FIG. 6 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 108). These computer program instructions may be provided to a processor (e.g., CPU 602) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 604 or computer data storage unit 612) that can direct a computer (e.g., computer system 102-1), other programmable data processing apparatus, or other devices (e.g., RFID tag 102-1 in FIG. 7) to function in a particular manner, such that the instructions (e.g., program 108) stored in the computer readable medium produce an article of manufacture including instructions which implement the function/act specified in the flowchart and/or block diagram block or blocks.

The computer program instructions may also be loaded onto a computer (e.g., computer system 102-1), other programmable data processing apparatus, or other devices (e.g. RFID tag 102-1 in FIG. 7) to cause a series of operational steps to be performed on the computer, other programmable apparatus, or other devices to produce a computer implemented process such that the instructions (e.g., program 108) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of collaboratively synchronizing devices at a time slot level where the devices are communicating in an ad hoc network. Thus, an embodiment of the present invention discloses a process for supporting computer infrastructure, comprising integrating, hosting, maintaining and deploying computer-readable code (e.g., program code 108) into a computer system (e.g., computer system 102-1 in FIG. 6 or RFID tag 102-1 in FIG. 7), wherein the code in combination with the computer system is capable of performing a process of collaboratively synchronizing devices at a time slot level where the devices are communicating in an ad hoc network.

In another embodiment, the invention provides a business method that performs the process steps of the invention on a subscription, advertising and/or fee basis. That is, a service provider, such as a Solution Integrator, can offer to create, maintain, support, etc. a process of collaboratively synchronizing devices at a time slot level where the devices are communicating in an ad hoc network. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Figure 7:
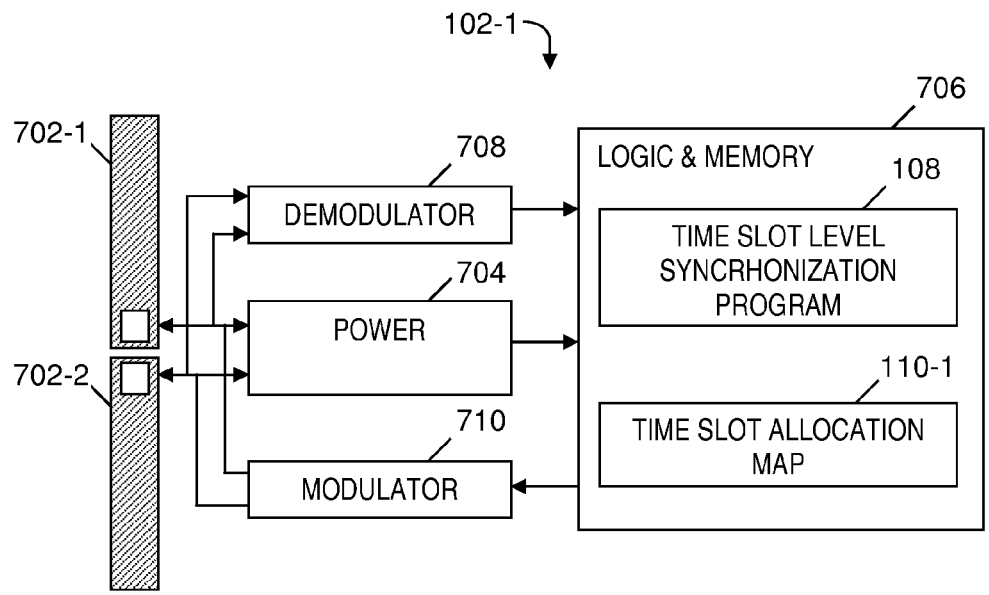
FIG. 7 is a block diagram of a radio frequency identification (RFID) tag comprising the computer device that is included in the system of FIG. 1 and that implements the process of FIG. 2, in accordance with embodiments of the present invention.

The flowchart in FIG. 2 and the block diagrams in FIG. 1, FIG. 6 and FIG. 7 illustrate the architecture, functionality, and operation of possible implementations of systems, methods, and computer program products according to various embodiments of the present invention. In this regard, each block in the flowchart or block diagrams may represent a module, segment, or portion of code (e.g., program code 108), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 7 is a block diagram of an RFID tag comprising the computer device (i.e., RFID tag 102-1) that is included in the system of FIG. 1 and that implements the process of FIG. 2, in accordance with embodiments of the present invention. RFID tag 102-1 in FIG. 7 is a passive high frequency (HF) RFID tag. As shown, the tag 102-1 includes a dipole antenna comprising two parts 702-1 and 702-2 that are connected to a power generating circuit 704 that provides current from a received signal (i.e., a message received from an RFID tag in network 106 in FIG. 1) to the logic and memory circuit 706, to the demodulator 708, and to the modulator 710. The input of demodulator 708 is connected to the antenna (parts 702-1 and 702-2) for receiving the signal and for transmitting the received signal to the logic and memory circuit 706, after having demodulated the received signal. The input of modulator 710 is connected to the logic and memory circuit 706 for receiving the signal to be transmitted to tags in network 106 (see FIG. 1). The output of modulator 710 is connected to the antenna (parts 702-1 and 702-2) for transmitting the signal to tags in network 106 (see FIG. 1) after the signal has been modulated in modulator 710.

Logic and memory circuit 706 may store time slot level synchronization program code 108 that provides the logic for collaboratively synchronizing devices at a time slot level, where the devices are communicating in an ad hoc network. Logic and memory circuit 706 may also store time slot allocation map 110-1.

The present invention may implement tags in network 106 (see FIG. 1) that are active or passive HF and/or Surface Acoustic Wave (SAW) tags. The tags in network 106 (see FIG. 1) may also include semi-passive RFID tags. Further, the present invention contemplates any radio frequency identifier tags allowing wireless identifier access that may replace the RFID tags or be used in combination with RFID tags.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of collaboratively synchronizing devices in an ad hoc network, the method comprising the steps of:
    a device $T_i$ communicating with other devices in the ad hoc network by a Media Access Control (MAC) scheme based on time frames, each time frame having S time slots, the device $T_i$ and the other devices being N devices in the ad hoc network, the ad hoc network having no network infrastructure, each time slot included in the S time slots is allocated to one or more corresponding devices included in the N devices, wherein N is an integer greater than 2, wherein N is less than or equal to S, wherein S is an integer, and wherein no device of the N devices acts as a master device or base station in the ad hoc network that dictates an allocation of the S time slots to the N devices;
    in response to a transmission by a device $T_j$ of a map stored in the device $T_j$ to one or more other devices listening to the device $T_j$, the device $T_i$ determining the map indicates a conflict between device $T_i$ and another device, the conflict indicated by a same time slot included in the S time slots being allocated to the device $T_i$ and the other device, wherein the transmission is performed in response to a determination by the device $T_j$ that a Boolean value is true, the Boolean value having a predetermined probability p of being true if the device $T_j$ is in an alive mode reached in response to the device $T_j$ hearing messages from peer devices in the ad hoc network or the Boolean value having a predetermined probability q of being true if the device $T_j$ is in a dormant mode reached in response to a delay since a last reception by the device $T_j$ of a message exceeding a delay threshold, wherein p and q are determined by a probability random number generator so that p>q and q>0, wherein p and q indicate respective likelihoods of performing the transmission, wherein the determination that the Boolean value is true is performed in response to a determination by the device $T_j$ that a current time slot s included in the S time slots is occurring in a time frame which is included in the time frames and that the current time slot s is allocated to the device $T_j$, wherein the device $T_j$ is included in the N devices, wherein the one or more other devices are included in the N devices and include the device $T_i$, and wherein the map includes allocations of the S time slots to the N devices; and
    in response to the step of determining the map indicates the conflict, the device $T_i$ resolving the conflict by allocating another time slot included in the S time slots to the device $T_i$ so that different time slots are allocated to the device $T_i$ and the other device and each time slot included in the S time slots is allocated to no more than a single corresponding device included in the N devices.

2. The method of claim 1, wherein the step of determining the map indicates the conflict includes the step of determining the conflict is between the device $T_i$ and a device $T_k$, the device $T_k$ being the other device, wherein the step of determining the conflict is between the devices $T_i$ and $T_k$ is based on $T_j=T_k$ and the device $T_j$ being allocated the same time slot as the device $T_i$, or based on $T_j \neq T_k$ and the device $T_j$ previously receiving a transmission of another map from another device of the N devices, the other map indicating the same time slot is allocated to the devices $T_i$ and $T_k$, and the transmission of the other map having occurred prior to the transmission of the map.

3. The method of claim 1, further comprising the step of the device $T_i$ receiving the map that includes the allocation of the S time slots to the N devices, the allocation of the S time slots including first, second and third fields corresponding to the S time slots, wherein the first field is a busy field that includes busy field indicators corresponding to the S time slots, each busy field indicator selected from the group consisting of a first busy field indicator that indicates a corresponding time slot of the S time slots is free to be allocated to a device of the N devices, a second busy field indicator that indicates the corresponding time slot is busy and allocated to exactly one device of the N devices, and a third busy field indicator that indicates the corresponding time slot is overbooked and allocated to two or more devices of the N devices, wherein the second field is an ID field that includes identifiers, each identifier identifying a corresponding device of the N devices, and wherein the third field which is a life credit field includes life credit indicators, each life credit indicator indicating how up-to-date a corresponding busy field indicator in the busy field is.

4. The method of claim 3, wherein the step of resolving the conflict includes the steps of:
    determining the current time slot s is allocated to devices $T_i$ and $T_j$;
    in response to the step of determining the current time slot s is allocated to devices $T_i$ and $T_j$, determining one or more time slots of the S time slots other than the current time slot s are free to be allocated;
    in response to the step of determining the one or more time slots are free, removing the device $T_i$ from the current time slot s;
    selecting a new time slot from the one or more time slots determined to be free and allocating the new time slot to the device $T_i$;
    setting a first value of the busy field to the second busy field indicator to indicate that the new time slot is busy and allocated to exactly one device of the N devices, wherein the exactly one device is the device $T_i$; and
    setting a second value of the life credit field to indicate that the first value of the busy field is information that has maximum freshness according to predetermined criteria.

5. The method of claim 3, further comprising the steps of:
    subsequent to a receipt by the device $T_i$ of the map, the device $T_i$ updating a first set of information corresponding to a time slot $x_i$ allocated to device $T_i$ based on the map; and
    subsequent to the receipt by the device $T_i$ of the map, the device $T_i$ updating a second set of information corresponding to time slots other than the time slot $x_i$ based on the map.

6. The method of claim 5, wherein the step of updating the first set of information corresponding to the time slot $x_i$ includes the steps of:
    setting a first value of the life credit field corresponding to the time slot $x_i$ to indicate that information associated with the time slot $x_i$ and stored in the device $T_i$ has maximum freshness according to predetermined criteria;
    determining a second value of the busy field corresponding to the current time slot s is equal to the first busy field indicator that indicates the current time slot s is free to be allocated;
    in response to the step of determining the second value of the busy field is equal to the first busy field indicator, setting the second value of the busy field corresponding to the current time slot s to the second busy field indicator to indicate the current time slot s is busy and allocated only to the device $T_j$;

in response to the step of determining the second value of the busy field is equal to the first busy field indicator, setting the ID field corresponding to the current time slot s to a hashed version of an identifier of the device $T_j$; and in response to the step of determining the second value of the busy field is equal to the first busy field indicator, setting the life credit field corresponding to the current time slot s to a value that indicates information associated with the current time slot s and stored in the device $T_i$ has maximum freshness according to the predetermined criteria.

7. The method of claim 5, wherein the step of updating the first set of information corresponding to the time slot $x_i$ includes the steps of:

setting a first value of the life credit field corresponding to the time slot $x_i$ to indicate that information associated with the time slot $x_i$ and stored in the device $T_i$ has maximum freshness according to predetermined criteria;

determining a second value of the busy field corresponding to the current time slot s is equal to the second busy field indicator that indicates the current time slot s is busy and the ID field corresponding to the current time slot s is not equal to a hashed version of an identifier of the device $T_j$;

in response to the step of determining the second value of the busy field is equal to the second busy field indicator and the ID field corresponding to the current time slot s is not equal to the hashed version of the identifier of the device $T_j$, setting the second value of the busy field corresponding to the current time slot s to the third busy field indicator to indicate the current time slot s is overbooked and allocated to the device $T_j$ and to a second device of the N devices that is not the device $T_j$;

in response to the step of setting the second value of the busy field to the third busy field indicator to indicate the current time slot s is overbooked, the device $T_i$ detecting a conflict between the device $T_j$ and the second device based on the current time slot s being overbooked; and in response to the step of determining the second value of the busy field is equal to the second busy field indicator and the ID field corresponding to the current time slot s is not equal to the hashed version of the identifier of the device $T_j$, setting the life credit field corresponding to the current time slot s to a value that indicates information associated with the current time slot s and stored in the device $T_i$ has maximum freshness according to the predetermined criteria.

8. The method of claim 5, wherein the step of updating the first set of information corresponding to the time slot $x_i$ includes the steps of:

setting a first value of the life credit field corresponding to the time slot $x_i$ to indicate that information associated with the time slot $x_i$ and stored in the device $T_i$ has maximum freshness according to predetermined criteria;

determining a second value of the busy field corresponding to the current time slot s is equal to the second busy field indicator that indicates the current time slot s is busy and the ID field corresponding to the current time slot s is equal to a hashed version of an identifier of the device $T_j$;

in response to the step of determining the second value of the busy field is equal to the second busy field indicator and the ID field corresponding to the current time slot s is equal to the hashed version of the identifier of the device $T_j$, setting the life credit field corresponding to the current time slot s to a value that indicates information associated with the current time slot s and stored in the device $T_i$ has maximum freshness according to the predetermined criteria.

9. The method of claim 5, wherein the step of updating the second set of information corresponding to time slots other than the time slot $x_i$ includes the steps of:

determining the busy field corresponding to the time slot $x_i$ and stored in the map is the third busy field indicator that indicates the time slot $x_i$ is overbooked;

in response to the step of determining the busy field corresponding to the time slot $x_i$ is the third busy field indicator that indicates the time slot $x_i$ is overbooked, determining one or more time slots of the S time slots other than the time slot $x_i$ are free to be allocated;

in response to the step of determining the one or more time slots are free, removing the device $T_i$ from the time slot $x_i$;

selecting a new time slot from the one or more time slots determined to be free and allocating the new time slot to the device $T_i$;

setting a first value of the busy field corresponding to the new time slot to the second busy field indicator to indicate that the new time slot is busy and allocated to exactly one device of the N devices, wherein the exactly one device is the device $T_i$; and setting a second value of the life credit field corresponding to the time slot $x_i$ to indicate that the first value of the busy field is information that has maximum freshness according to predetermined criteria.

10. The method of claim 5, wherein the step of updating the second set of information corresponding to time slots other than the time slot $x_i$ includes the steps of:

determining a first value of the busy field corresponding to a time slot k of the S time slots other than the current time slot s and stored in the map is greater than a second value of the busy field corresponding to the time slot k and stored in the device $T_i$;

in response to the step of determining the first value of the busy field corresponding to the time slot k is greater than the second value of the busy field corresponding to the time slot k, setting the second value of the busy field corresponding to the time slot k and stored in the device $T_i$ to the first value of the busy field corresponding to the time slot k and stored in the map; and in response to the step of determining the first value of the busy field corresponding to the time slot k is greater than the second value of the busy field corresponding to the time slot k, setting a third value of the life credit field corresponding to the time slot k and stored in the device $T_i$ to a fourth value of the life credit field corresponding the time slot k and stored in the map.

11. The method of claim 5, wherein the step of updating the second set of information corresponding to time slots other than the time slot $x_i$ includes the steps of:

determining a first value of the busy field corresponding to a time slot k of the S time slots other than the current time slot s and stored in the map is equal to a second value of the busy field corresponding to the time slot k and stored in the device $T_i$; and in response to the step of determining the first value of the busy field corresponding to the time slot k is equal to the second value of the busy field corresponding to the time slot k, setting a third value of the life credit field corresponding to the time slot k and stored in the device $T_i$ to a maximum of the third value of the life credit field corresponding to the time slot k and stored in the device $T_i$ and a fourth value of the life credit field corresponding to the time slot k and stored in the map.

12. The method of claim 3, further comprising the steps of:
   in response to the transmission of the map, the device $T_j$ decrementing each entry in the life credit field;
   determining a first entry in the life credit field indicates that a second entry in the busy field corresponding to the first entry has not been refreshed for a period of time that exceeds a predetermined threshold; and
   updating the second entry in the busy field to the first busy field indicator that indicates that a time slot corresponding to the first entry and to the second entry is free to be allocated to the device of the N devices.

13. The method of claim 12, further comprising the steps of:
   in response to the step of decrementing each entry in the life credit field, determining all entries in the life credit field are null;
   in response to the step of determining all entries in the life credit field are null, updating a state of the device $T_j$ to Dormant; and
   subsequent to the step of updating the state to Dormant and in response to a determination of a subsequent occurrence of time slot s, the device $T_j$ transmitting the map stored in device $T_j$ with the probability q.

14. The method of claim 1, the method further comprising the step of:
   providing at least one support service for at least one of creating, integrating, hosting, maintaining, and deploying computer-readable program code in the device $T_i$, the program code being executed by a processor included in device $T_i$ to implement the steps of communicating, determining the map indicates the conflict, and resolving the conflict.

15. A computer system comprising:
   a hardware-based processor;
   a hardware-based computer-readable memory unit coupled to the processor, the memory unit containing instructions that are executed by the processor to implement a method of collaboratively synchronizing devices in an ad hoc network, the computer system being a device $T_i$, and the method comprising the steps of:
   the device $T_i$ communicating with other devices in the ad hoc network by a Media Access Control (MAC) scheme based on time frames, each time frame having S time slots, the device $T_i$ and the other devices being N devices in the ad hoc network, the ad hoc network having no network infrastructure, each time slot included in the S time slots is allocated to one or more corresponding devices included in the N devices, wherein N is an integer greater than 2, wherein N is less than or equal to S, wherein S is an integer, and wherein no device of the N devices acts as a master device or base station in the ad hoc network that dictates an allocation of the S time slots to the N devices;
   in response to a transmission by a device $T_j$ of a map stored in the device $T_j$ to one or more other devices listening to the device $T_j$, the device $T_i$ determining the map indicates a conflict between device $T_i$ and another device, the conflict indicated by a same time slot included in the S time slots being allocated to the device $T_i$ and the other device, wherein the transmission is performed in response to a determination by the device $T_i$ that a Boolean value is true, the Boolean value having a predetermined probability p of being true if the device $T_i$ is in an alive mode reached in response to the device $T_i$ hearing messages from peer devices in the ad hoc network or the Boolean value having a predetermined probability q of being true if the device $T_i$ is in a dormant mode reached in response to a delay since a last reception by the device $T_i$ of a message exceeding a delay threshold, wherein p and q are determined by a probability random number generator so that p>q and q>0, wherein p and q indicate respective likelihoods of performing the transmission, wherein the determination that the Boolean value is true is performed in response to a determination by the device $T_i$ that a current time slot s included in the S time slots is occurring in a time frame which is included in the time frames and that the current time slot s is allocated to the device $T_i$, wherein the device $T_i$ is included in the N devices, wherein the one or more other devices are included in the N devices and include the device $T_i$, and wherein the map includes allocations of the S time slots to the N devices; and
   in response to the step of determining the map indicates the conflict, the device $T_i$ resolving the conflict by allocating another time slot included in the S time slots to the device $T_i$ so that different time slots are allocated to the device $T_i$ and the other device and each time slot included in the S time slots is allocated to no more than a single corresponding device included in the N devices.

16. The computer system of claim 15, wherein the step of determining the map indicates the conflict includes the step of determining the conflict is between the device $T_i$ and a device $T_k$, the device $T_k$ being the other device, wherein the step of determining the conflict is between the devices $T_i$ and $T_k$ is based on $T_j=T_k$ and the device $T_j$ being allocated the same time slot as the device $T_i$, or based on $T_j \ne T_k$ and the device $T_j$ previously receiving a transmission of another map from another device of the N devices, the other map indicating the same time slot is allocated to the devices $T_i$ and $T_k$, and the transmission of the other map having occurred prior to the transmission of the map.

17. The computer system of claim 15, wherein the method further comprises the step of the device $T_i$ receiving the map that includes the allocation of the S time slots to the N devices, the allocation of the S time slots including first, second and third fields corresponding to the S time slots, wherein the first field is a busy field that includes busy field indicators corresponding to the S time slots, each busy field indicator selected from the group consisting of a first busy field indicator that indicates a corresponding time slot of the S time slots is free to be allocated to a device of the N devices, a second busy field indicator that indicates the corresponding time slot is busy and allocated to exactly one device of the N devices, and a third busy field indicator that indicates the corresponding time slot is overbooked and allocated to two or more devices of the N devices, wherein the second field is an ID field that includes identifiers, each identifier identifying a corresponding device of the N devices, and wherein the third field which is a life credit field includes life credit indicators, each life credit indicator indicating how up-to-date a corresponding busy field indicator in the busy field is.

18. A computer program product comprising:
   a computer readable storage medium: and
   computer readable program code stored in the computer readable storage medium, the computer readable program code containing instructions that are executed by a processor included in a device $T_i$ to implement a method of collaboratively synchronizing devices in an ad hoc network, the method comprising the steps of:
   the device $T_i$ communicating with other devices in the ad hoc network by a Media Access Control (MAC) scheme based on time frames, each time frame having S time slots, the device $T_i$ and the other devices being the N devices in the ad hoc network, the ad hoc network having no network infrastructure, each time slot included in the S time slots is allocated to one or more corresponding devices included in the N devices, wherein N is an integer greater than 2, wherein N is less than or equal to S, wherein S is an integer, and wherein no device of the N devices acts as a master device or base station in the ad hoc network that dictates an allocation of the S time slots to the N devices;
   in response to a transmission by a device $T_j$ of a map stored in the device $T_j$ to one or more other devices listening to the device $T_j$, the device $T_i$ determining the map indicates a conflict between device $T_i$ and another device, the conflict indicated by a same time slot included in the S time slots being allocated to the device $T_i$ and the other device, wherein the transmission is performed in response to a determination by the device $T_j$ that a Boolean value is true, the Boolean value having a predetermined probability p of being true if the device $T_j$ is in an alive mode reached in response to the device $T_j$ hearing messages from peer devices in the ad hoc network or the Boolean value having a predetermined probability q of being true if the device $T_j$ is in a dormant mode reached in response to a delay since a last reception by the device $T_j$ of a message exceeding a delay threshold, wherein p and q are determined by a probability random number generator so that p>q and q>0, wherein p and q indicate respective likelihoods of performing the transmission, wherein the determination that the Boolean value is true is performed in response to a determination by the device $T_j$ that a current time slot s included in the S time slots is occurring in a time frame which is included in the time frames and that the current time slot s is allocated to the device $T_j$, wherein the device $T_j$ is included in the N devices, wherein the one or more other devices are included in the N devices and include the device $T_i$, and wherein the map includes allocations of the S time slots to the N devices; and
   in response to the step of determining the map indicates the conflict, the device $T_i$ resolving the conflict by allocating another time slot included in the S time slots to the device $T_i$ so that different time slots are allocated to the device $T_i$ and the other device and each time slot included in the S time slots is allocated to no more than a single corresponding device included in the N devices.

19. The computer program product of claim 18, wherein the step of determining the map indicates the conflict includes the step of determining the conflict is between the device $T_i$ and a device $T_k$, the device $T_k$ being the other device, wherein the step of determining the conflict is between the devices $T_i$ and $T_k$ is based on $T_j=T_k$ and the device $T_j$ being allocated the same time slot as the device $T_i$, or based on $T_j \neq T_k$ and the device $T_j$ previously receiving a transmission of another map from another device of the N devices, the other map indicating the same time slot is allocated to the devices $T_i$ and $T_k$, and the transmission of the other map having occurred prior to the transmission of the map.

20. The computer program product of claim 18, wherein the method further comprises the step of the device $T_i$ receiving the map that includes the allocation of the S time slots to the N devices, the allocation of the S time slots including first, second and third fields corresponding to the S time slots, wherein the first field is a busy field that includes busy field indicators corresponding to the S time slots, each busy field indicator selected from the group consisting of a first busy field indicator that indicates a corresponding time slot of the S time slots is free to be allocated to a device of the N devices, a second busy field indicator that indicates the corresponding time slot is busy and allocated to exactly one device of the N devices, and a third busy field indicator that indicates the corresponding time slot is overbooked and allocated to two or more devices of the N devices, wherein the second field is an ID field that includes identifiers, each identifier identifying a corresponding device of the N devices, and wherein the third field which is a life credit field includes life credit indicators, each life credit indicator indicating how up-to-date a corresponding busy field indicator in the busy field is.

* * * * *